(12) United States Patent
Shinkawa

(10) Patent No.: US 11,640,053 B2
(45) Date of Patent: May 2, 2023

(54) MOVABLE DEVICE, IMAGE PROJECTION APPARATUS, HEADS-UP DISPLAY, LASER HEADLAMP, HEAD-MOUNTED DISPLAY, OBJECT RECOGNITION DEVICE, AND MOBILE OBJECT

(71) Applicant: RICOH COMPANY, LTD., Tokyo (JP)

(72) Inventor: Mizuki Shinkawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 158 days.

(21) Appl. No.: 17/176,651

(22) Filed: Feb. 16, 2021

(65) Prior Publication Data

US 2021/0286167 A1    Sep. 16, 2021

(30) Foreign Application Priority Data

Mar. 16, 2020 (JP) .............................. JP2020-045696

(51) Int. Cl.
*G02B 26/00* (2006.01)
*G02B 26/08* (2006.01)
(Continued)

(52) U.S. Cl.
CPC .......... *G02B 26/0816* (2013.01); *B60K 35/00* (2013.01); *F21S 41/16* (2018.01); *F21S 41/675* (2018.01); *B60K 2370/1529* (2019.05)

(58) Field of Classification Search
CPC .... G02B 26/0816; F21S 41/675; F21S 41/16; B60K 35/00
See application file for complete search history.

(56) References Cited

U.S. PATENT DOCUMENTS 3,919,895 A * 11/1975 Kerr ........................ F16H 35/02
                                                                    475/16
2004/0165249 A1* 8/2004 Aubuchon ......... G02B 26/0841
                                                                    359/291
(Continued)

FOREIGN PATENT DOCUMENTS

DE  10 2018 215 528 A1    3/2020
EP       3 343 265 A1     7/2018
(Continued)

OTHER PUBLICATIONS

Extended European Search Report dated Jul. 16, 2021 in European Patent Application No. 21157075.9, 10 pages.

*Primary Examiner* — Gerald J Sufleta, II
(74) *Attorney, Agent, or Firm* — Xsensus LLP

(57) ABSTRACT

A movable device includes a first member and a second member. The first actuator includes a supporting unit having one end coupled to the movable unit to support the movable unit and a drive unit coupled to the other end of the supporting unit. The drive unit is configured to deform the supporting unit to cause the movable unit to oscillate. The movable device has a first region and a second region divided by a virtual line passing through the center of the movable unit and parallel to a rotation axis of the movable unit. The supporting unit is coupled to the movable unit within the second region. An edge of the drive unit, which is opposite to the fixed edge, faces the movable unit as viewed from the center of the movable unit in a plan view.

20 Claims, 29 Drawing Sheets

(51) Int. Cl.
  *F21S 41/675* (2018.01)
  *F21S 41/16* (2018.01)
  *B60K 35/00* (2006.01)

(56) References Cited

U.S. PATENT DOCUMENTS

| | | | | |
|---|---|---|---|---|
| 2007/0171500 | A1* | 7/2007 | Jeong | G02B 26/0858 359/224.1 |
| 2008/0144154 | A1* | 6/2008 | Asai | G02B 26/0858 359/224.1 |
| 2008/0297868 | A1* | 12/2008 | Mizumoto | G02B 26/0858 359/199.1 |
| 2011/0279879 | A1* | 11/2011 | Wakabayashi | G02B 26/101 359/197.1 |
| 2013/0070167 | A1* | 3/2013 | Tagami | G02B 26/0858 359/198.1 |
| 2016/0011393 | A1* | 1/2016 | Kim | H01L 41/0825 359/698 |
| 2017/0272710 | A1* | 9/2017 | Mikawa | H04N 9/3194 |
| 2018/0282147 | A1 | 10/2018 | Shinkawa et al. | |
| 2019/0219908 | A1* | 7/2019 | Saito | G02B 26/0866 |
| 2019/0391394 | A1* | 12/2019 | Shinkawa | G06V 20/58 |
| 2020/0174246 | A1* | 6/2020 | Wakabayashi | G02B 26/085 |
| 2021/0011281 | A1* | 1/2021 | Duan | G02B 7/1821 |

FOREIGN PATENT DOCUMENTS

| | | |
|---|---|---|
| JP | 2011-175045 | 9/2011 |
| JP | 2016-102812 | 6/2016 |
| WO | 2010/035469 A1 | 4/2010 |
| WO | 2010/113602 A1 | 10/2010 |
| WO | 2020/052919 A1 | 3/2020 |

* cited by examiner

MOVABLE DEVICE, IMAGE PROJECTION APPARATUS, HEADS-UP DISPLAY, LASER HEADLAMP, HEAD-MOUNTED DISPLAY, OBJECT RECOGNITION DEVICE, AND MOBILE OBJECT

CROSS-REFERENCE TO RELATED APPLICATIONS

This patent application is based on and claims priority pursuant to 35 U.S.C. § 119(a) to Japanese Patent Application No. 2020-045696, filed on Mar. 16, 2020, in the Japan Patent Office, the entire disclosure of which is hereby incorporated by reference herein.

BACKGROUND

Technical Field

Embodiments of the present disclosure relate to a movable device, an image projection apparatus, a head-up display (HUD), a laser headlamp, a head-mounted display (HMD), an object recognition device, and a mobile object.

Related Art

In recent years, with the development of micromachining technology applying semiconductor manufacturing technology, development of micro electro mechanical systems (MEMS) device manufactured by micromachining silicon or glass is advancing.

As an example of MEMS device, a light deflector is known that scans light by rotating a movable unit around a first axis and a second axis, which are orthogonal to each other. The light deflector has the movable unit, a supporting unit supporting the movable unit, and four coupling portions, each coupling the movable unit and the supporting unit together. The four coupling portions are provided at an interval of 90° on the periphery of the movable unit in the circumferential direction of the movable unit in a plan view.

SUMMARY

In one aspect of this disclosure, there is described a movable device including a first member and a second member. The first member includes: a movable unit; a first actuator configured to cause the movable unit to oscillate; and a stationary part to which the first actuator is fixed. The first actuator includes: a supporting unit having one end coupled to the movable unit to support the movable unit; and a drive unit having a fixed edge. The drive unit is coupled to the other end of the supporting unit, the drive unit configured to deform the supporting unit to cause the movable unit to oscillate. The second member includes two or more other actuators other than the first actuator, configured to cause the movable unit to oscillate. The edge of the drive unit, which is opposite to the fixed edge, faces the movable unit as viewed from the center of the movable unit in a plan view. The movable device has a first region including the drive unit and a second region without the drive unit, which are divided by a virtual line passing through the center of the movable unit and parallel to a rotation axis of the movable unit. The supporting unit is coupled to the movable unit within the second region.

In another aspect of this disclosure, there is disclosed a movable device including a first member and a second member. The first member includes: a movable unit; a first actuator configured to cause the movable unit to oscillate; and a stationary part to which the first actuator is fixed. The first actuator includes: a supporting unit having one end coupled to the movable unit to support the movable unit; and a drive unit having a fixed edge. The drive unit is coupled to the other end of the supporting unit, the drive unit configured to deform the supporting unit to cause the movable unit to oscillate. The second member includes two or more other actuators other than the first actuator, configured to cause the movable unit to oscillate. The edge of the drive unit, which is opposite to the fixed edge, faces the movable unit as viewed from the center of the movable unit in a plan view. The movable device has a first region including the drive unit and a second region without the drive unit, which are divided by a virtual line passing through the center of the movable unit and orthogonal to a rotation axis of the movable unit. The supporting unit is coupled to the movable unit within the second region.

In even another aspect of this disclosure, there is disclosed an image projection apparatus including a light source to emit light; and the movable device configured to deflect the light emitted from the light source to project an image.

In still another aspect of this disclosure, there is disclosed a head up display including the movable device.

In yet another aspect of this disclosure, a laser head lamp includes the movable device.

Further described is a head mount display includes the movable device.

Still further described is an object recognition device including a light source to emit light; the movable device configured to deflect the light emitted from the light source; and a photosensor configured to detect light reflected by an object that has been illuminated with the light deflected by the movable device to recognize the object.

Yet further described is a mobile object including the head up display.

In another aspect of this disclosure, there is discloses a mobile object including the laser head lamp.

In even aspect of this disclosure, there is disclosure a mobile object including the object recognition device.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein.

Figure 1:
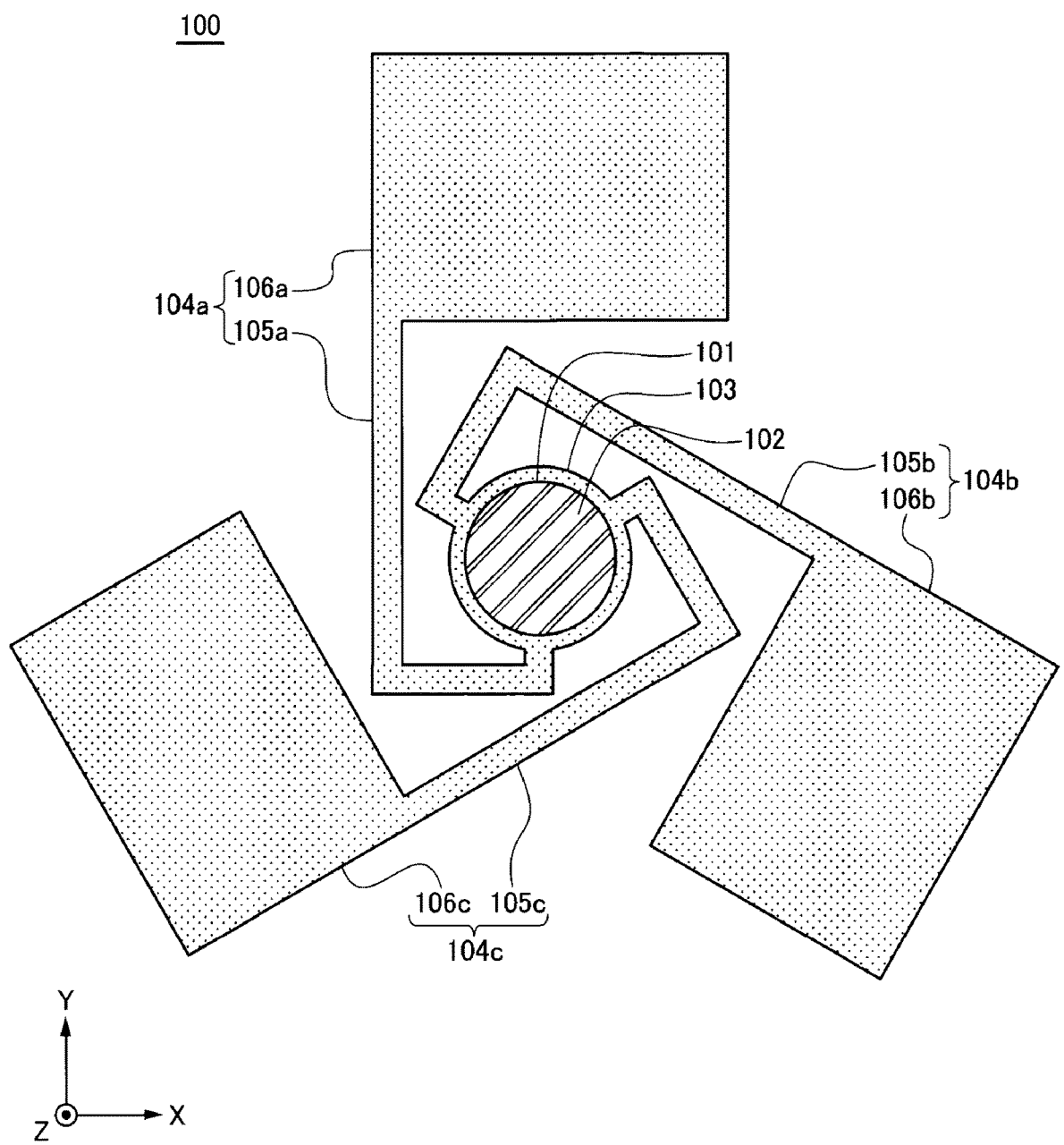
FIG. 1 is a plan view of a light deflector as a movable device according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Embodiments of the present disclosure provide a movable device that enables a larger scanning angle.

Embodiments of the present disclosure are described in detail with reference to the drawings. Like reference signs are applied to identical or corresponding components throughout the drawings and redundant description thereof may be omitted.

In the description of the embodiments of the present disclosure, terms such as rotation, oscillation, and movement (movable) are synonymous. In the drawings, the Z direction is parallel to a direction in which layers are stacked in a piezoelectric drive circuit, and the X direction and the Y direction are orthogonal to each other within a plane perpendicular to the Z direction. Further, the "plan view" refers to viewing an object in the Z direction.

FIG. 1 is a plan view of a light deflector 100 as a movable device according to an embodiment of the present disclosure. The light deflector 100 in FIG. 1 includes a movable unit 103, a first actuator 104a, a second actuator 104b, and a third actuator 104c. The light deflector 100 is a three-phase light deflector adapted for the vector scanning involving deflecting incident light in multi-axial directions using the oscillation of the movable unit 103.

The movable unit 103 has, for example, a circular mirror unit 101 and a reflecting surface 102 on +Z surface of a base of the mirror unit 101. The mirror unit 101 includes, for example, a silicon layer. The mirror unit 101 may be formed from oxide material, inorganic material, or organic material. Alternatively, the mirror unit 101 may include a plurality of layers formed from different materials or the same material.

The reflecting surface 102 includes a thin metal film formed from, for example, aluminum (Al), gold (Au), and silver (Ag) or includes a multilayer film of Al, Au, and Ag. The mirror unit 101 may include a rib for strengthening the mirror unit 101 on −Z surface of the base of the mirror unit 101. The rib includes, for example, a silicon supporting layer and a silicon oxide layer, and can prevent distortion of the mirror unit 101 and the reflecting surface 102 caused by the movement of the movable unit 103.

The movable unit 103 has a circular shape and includes the mirror unit 101 and the reflecting surface 102. The movable unit 103 is supported by the first actuator 104a, the second actuator 104b, and the third actuator 104c to be rotatable.

The mirror unit 101 and the movable unit 103 each may have an elliptic shape, a polygonal shape, or any other shape.

The first actuator 104a, the second actuator 104b, and third actuator 104c cause the movable unit 103 to oscillate. The first actuator 104a include a supporting unit 105a and a drive unit 106a. The second actuator unit 104b has a supporting unit 105b and a drive unit 106b. The third actuator unit 104c has a supporting unit 105c and a drive unit 106c.

The first actuator 104a, the second actuator 104b, and the third actuator 104c have the same structure. To avoid redundant description, the structure of the first actuator 104a is described below, and the description of those of the second actuator 104b and the third actuator 104c are omitted.

In the first actuator 104a, the supporting unit 105a has one end coupled to the movable unit 103 and the other end coupled to the drive unit 106a to support the movable unit 103. The supporting unit 105a is not straight, but includes a bending portion. In the example of FIG. 1, the supporting unit 105a has two bending portions with a bending angle of substantially 90°.

In the first actuator 104a, the drive unit 106a coupled to the other end of the supporting unit 105a deforms the supporting unit 105a to cause the movable unit 103 to oscillate. The shape and configuration of the drive unit 106a are not particularly limited, and may be, for example, a meander structure. In some examples, the drive unit 106a includes a sensor. The sensor is not particularly limited, but is, for example, a displacement sensor (e.g., a piezoelectric sensor and a resistance strain gauge) or a temperature sensor to output a signal corresponding to the deformation.

The piezoelectric actuation, for example, is used to actuate the supporting unit 105a using the drive unit 106a. Alternatively, the electromagnetic actuation or the electrostatic actuation may be employed to actuate the supporting unit using the drive unit. The electromagnetic actuation uses the electromagnetic field to deform the supporting unit. The electrostatic actuation uses a comb-teeth electrode on the supporting unit. In some examples, coils or magnet array may be formed on the supporting unit. In some other examples, the resonant actuation or non-resonant actuation may be used to actuate the supporting unit.

Among these techniques, the piezoelectric actuation is suitable in that the piezoelectric drive circuit can be effectively placed, and upsizing of the light deflector as a whole can be prevented. The electrostatic actuation uses a comb-teeth electrode at the periphery of the drive unit and might likely cause an increase in the size of the light deflector as a whole. Further, the electromagnetic actuation has difficulties in arrangement of wires and magnets to define magnetic fields to be applied to a plurality of drive units through the wires, respectively, and also might likely cause an increase in the size of the light deflector as a whole.

Figure 2:
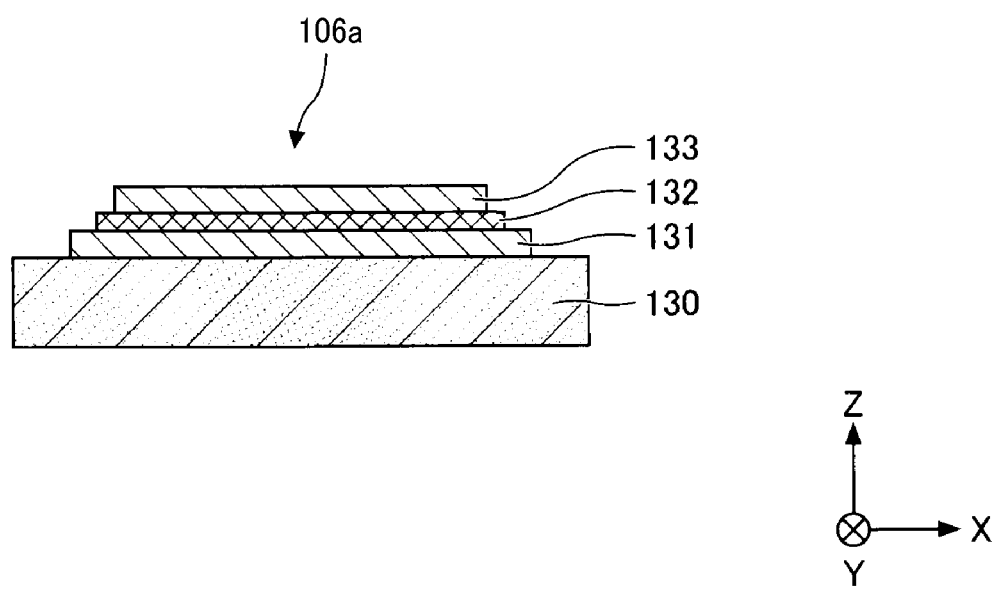
FIG. 2 is a cross-sectional view of a drive unit according to an embodiment of the present disclosure.

FIG. 2 is a cross-sectional view of the drive unit 106a in a case that the piezoelectric actuation is used to actuate the supporting unit 105a using the drive unit 106a, according to an embodiment of the present disclosure.

As illustrated in FIG. 2, the drive unit 106a includes a plurality of layers that is stacked in the thickness direction (i.e., the Z direction). Specifically, the drive unit 106a includes a silicon layer 130 that is a base serving as an elastic member. The silicon layer 130 has a thickness of, for example, approximately 20 to 60 micrometer (μm). The base that is the silicon layer 130 may be formed from material that is rigid and applicable to semiconductor processing. Alternatively, the base may be formed from inorganic material or organic material, or metal glass. Still alternatively, the base may have a multi-layer structure in which a plurality of materials is layered.

The drive units 106a includes the silicon layer 130 as an elastic member, a lower electrode 131 In the drive unit 106a, the lower electrode 131 on the +Z surface of the silicon layer 130, a piezoelectric layer 132, and an upper electrode 133, which are sequentially stacked on top of each other. The lower electrode 131, the piezoelectric layer 132, and the upper electrode 133 serve as a piezoelectric drive unit.

The lower electrode 131 and the upper electrode 133 are formed from, for example, gold (Au) or platinum (Pt). The piezoelectric layer 132 is formed from, for example, lead zirconate titanate (PZT) as piezoelectric material. However, any other type of piezoelectric material is also applicable.

Further, the piezoelectric drive unit (131, 132, and 133) may further include an intermediate electrode in stacked piezoelectric layers. The piezoelectric drive unit is a piezoelectric actuator that is electrically connected to an external control device and is driven by a voltage that is being applied thereto. In some examples, the +Z surface of the piezoelectric drive unit is covered with an insulator film that is formed from, for example, silicon oxide, and electrical wiring is provided on the +Z surface of the insulator film.

Figure 3:
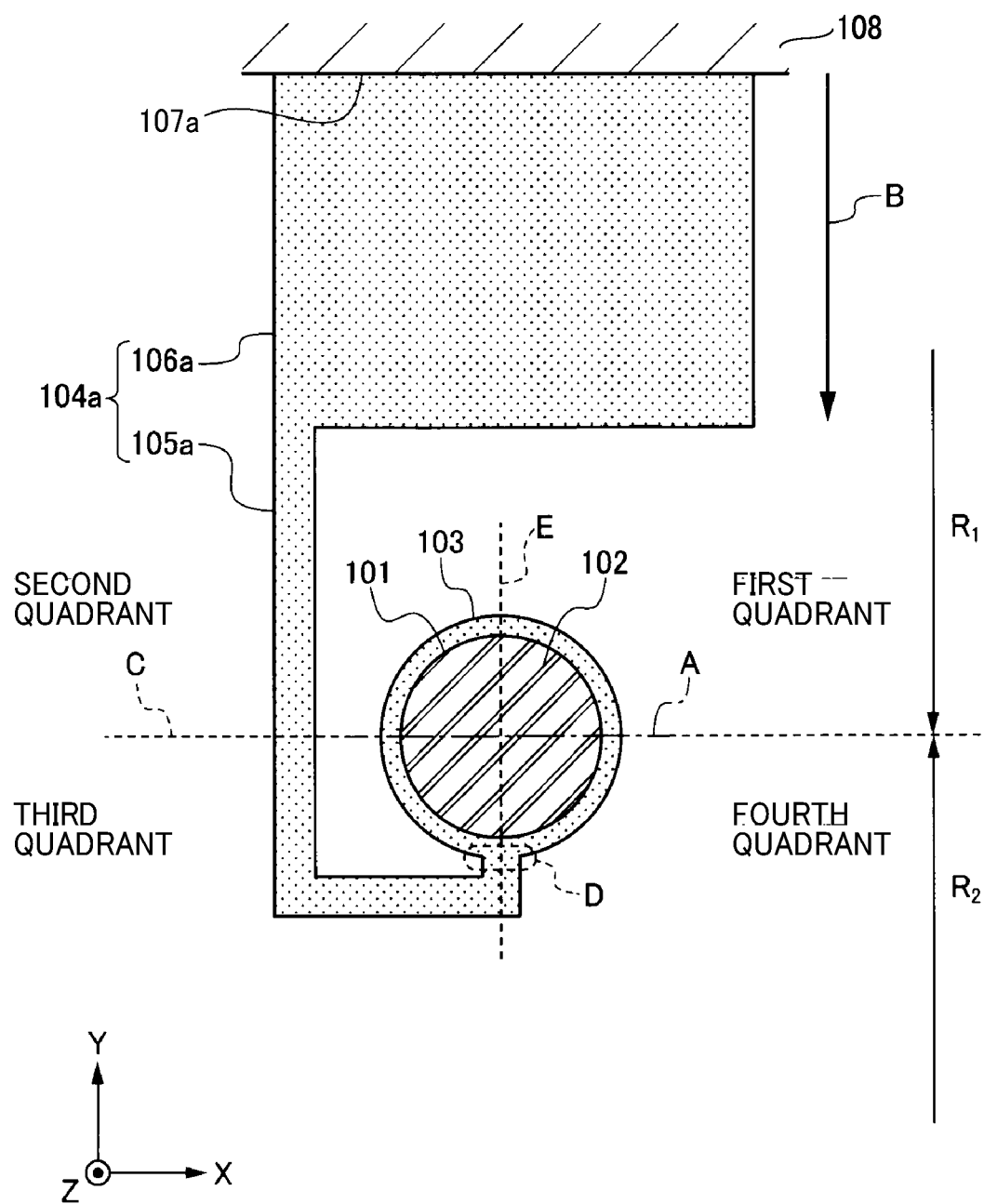
FIG. 3 is an illustration for describing a position at which a supporting unit is coupled to a movable unit, according to an embodiment of the present disclosure.

FIG. 3 is a partial plan view of the movable unit 103 and the first actuator 104a in FIG. 1, for describing a position at which a supporting unit 105a is coupled to the movable unit 103. In FIG. 3, the movable unit 103 is rotatable about a rotation axis A indicated by a dot-and-dash line when only the first actuator 104a is coupled to the movable unit 103. The drive unit 106a extends in a direction indicated by arrow B (i.e., a direction parallel to the Y-axis (i.e., the Y direction) in FIG. 3). The driving unit 106a has a fixed edge 107a at which the drive unit 106a is coupled to a stationary part 108. In FIG. 3, the fixed edge 107a is parallel to the X-axis (i.e., the X direction), and the shaded area adjacent to the fixed edge 107a refers to the stationary part 108.

The first actuator 104a is fixed to the stationary part 108, and the stationary part 108 includes, for example, a silicon supporting layer, silicon oxide layer, and a silicon active layer. For example, electrode connecting parts are formed on the stationary part 108. The electrode connecting parts are electrically connected to the lower electrode 131 and the upper electrode 133 of the drive unit 106a via the electrode wiring of, for example, aluminum (Al). The electrode connecting parts are also electrically connected to, for example, a control device outside the light deflector 100.

The movable unit 103, the first actuator 104a, and the stationary part 108 are collectively referred to as a first member. Further, another actuator other than the first actuator 104a to cause the movable unit 103 to oscillate is referred to as a second member.

A virtual line C passes through the center of the movable unit 103 and is parallel to the rotation axis A of the movable unit 103. In the example of FIG. 3, the virtual line C passing through the center of the movable unit 103 is aligned with the rotation axis A. In some examples, the virtual line C does not pass through the center of the movable unit 103, and is not aligned with the rotation axis A.

The movable unit 103 is substantially round, elliptic, or polygonal. In any case, the center of the movable unit 103 is the position of the center of gravity in a plan view in the embodiments of the present disclosure and within the scope of the claims.

The movable unit 103 and the first actuator 104a are divided by the virtual line C into a first region $R_1$ including the drive unit 106a and a second region $R_2$ without the drive unit 106a.

In this case, the supporting unit 105a is coupled to the movable unit 103 in at least the second region $R_2$. In other words, a coupling portion D at which the supporting unit 105a is coupled to the movable unit 103 is at least partially within the second region $R_2$. The entirety of the coupling portion D may be within the second region $R_2$. In the example of FIG. 3, the entirety of the coupling portion D is within the second region $R_2$.

As described above, in the light deflector 100, at least part of the coupling portion D of the movable unit 103 and the supporting unit 105a of the first actuator 104a is within the second region $R_2$. The same applies to the coupling portion of the movable unit 103 and the supporting unit 105b of the second actuator 104b when the second actuator 104b is viewed independently, and also to the coupling portion of the movable unit 103 and the supporting unit 105c of the third actuator 104c when the third actuator 104c is viewed independently.

This configuration enables longer supporting units 105a, 105b, and 105c than a comparative example in which the coupling portion of the movable unit and the supporting unit is entirely within the first region $R_1$. This further enables the supporting units 105a, 105b, and 105c to easily move, and achieves an increase in the deflection angle of the movable unit 103 while enabling the light deflector 100 as a whole to maintain its tolerance to mechanical vibration. Thus, both a decrease in resonance frequency and an increase in scanning angle can be achieved.

As illustrated in FIGS. 1 and 3, each supporting unit has a part extending in a direction (i.e., the X direction in FIG. 3) perpendicular to the direction (i.e., the direction indicated by arrow B in FIG. 3), and extends to an area opposite to the other area of the drive unit 106a of the movable unit 103 with respect to the virtual line C, thus being connected to the movable unit 103. This configuration enables longer supporting units. As a result, the oscillation of the movable unit caused by one drive unit can be prevented from being inhibited by an actuator of another drive unit, and a larger scanning angle can be achieved. This configuration also prevents the physical interference between the supporting units in the case of FIG. 1 that a plurality of drive units is arranged at the periphery of the movable unit. Such an arrangement prevents an increase in chip size and achieves a compact light deflector 100.

Figure 4:
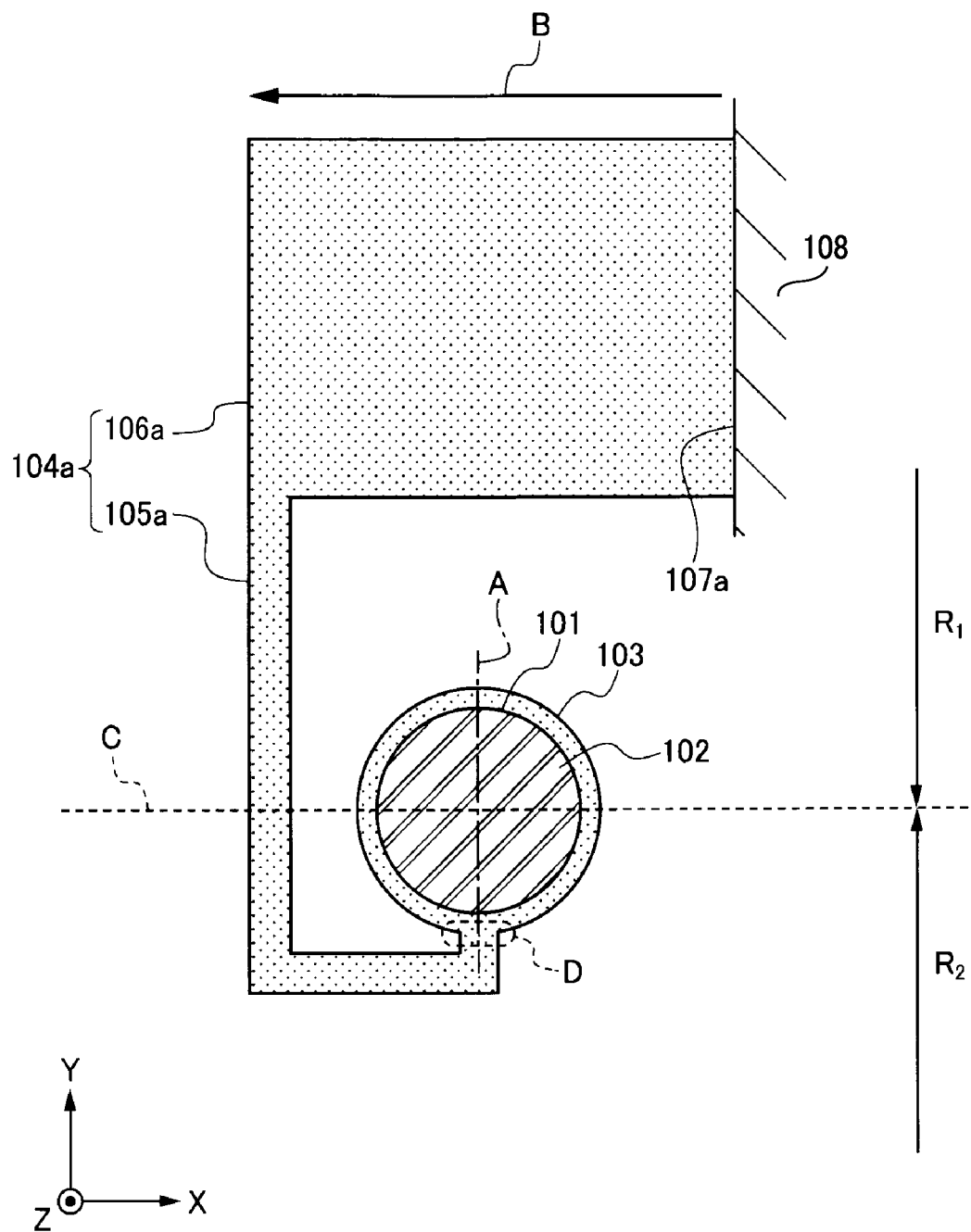
FIG. 4 is an illustration for describing a position at which the supporting unit is coupled to the movable unit, according to another embodiment of the present disclosure.

The position of the fixed edge 107a of the drive unit 106a is not limited to the position in FIG. 3, and the fixed edge 107a may be at the position as illustrated in FIG. 4. In other words, in the example of FIG. 3, the edge of the drive unit 106a (i.e., the edge opposite to the fixed edge 107a) faces the movable unit 103 as viewed from the center of the movable unit 103 in a plan view (i.e., when viewed from the fixed edge 107a in a plan view, the center of the movable unit 103 is farther from the fixed edge 107a (one edge of the drive unit 106a) than the other edge of the drive unit 106a). In the example of FIG. 4, the edge of the drive unit 106a (i.e., the edge opposite to the fixed edge 107a) does not face the movable unit 103 as viewed from the center of the movable unit 103 in a plan view (i.e., when viewed from the fixed edge 107a in a plan view, the center of the movable unit 103 is closer to the fixed edge 107a (one edge of the drive unit 106a) than the other edge of the drive unit 106a). Both of the examples in FIGS. 3 and 4 achieve longer supporting units 105a, 105b, and 105c by satisfying the followings.

The edge of the drive unit 106a as viewed from the center of the movable unit 103 refers to another edge of the drive unit 106a other than the fixed edge 107a in the direction indicated by arrow B (i.e., the edge opposite to the fixed edge 107a of the drive unit 106a). The edge of the drive unit 106a may not be a straight line and may be a curved line. In the example of FIG. 3, the drive unit 106a is rectangular. This is only one example, and the drive unit 106a may be polygonal or have a shape including a curve. In such a case that the drive unit 106a is polygonal or has a shape including a curve, the edge of the drive unit 106a is intended to be farthest from the fixed edge 107a among the edges of the drive unit 106a. When a plurality of edges is farthest from the fixed edge 107a, any one of the edges may be regarded as the edge of the drive unit 106a.

In FIG. 4, the fixed edge 107a is parallel to the Y-axis (i.e., the Y direction), and the shaded area adjacent to the fixed edge 107a refers to the stationary part 108. Further, the direction indicated by arrow B, in which the drive unit 106a extends, is parallel to the X-axis (i.e., the X direction). The rotation axis A when only the first actuator 104a is coupled to the movable unit 103 is parallel to the Y-axis (i.e., the Y direction).

The virtual line C passes through the center of the movable unit 103 and is orthogonal to the rotation axis A of the movable unit 103. The movable unit 103 and the first actuator 104a are divided by the virtual line C into a first region $R_1$ including the drive unit 106a and a second region $R_2$ without the drive unit 106a.

In this case, the supporting unit 105a is coupled to the movable unit 103 in at least the second region $R_2$. In other words, a coupling portion D at which the supporting unit 105a is coupled to the movable unit 103 is at least partially within the second region $R_2$. The entirety of the coupling portion D may be within the second region $R_2$. In the example of FIG. 4, the entirety of the coupling portion D is within the second region $R_2$. The configuration in FIG. 4 also enables a longer supporting unit as in the example of FIG. 3, and exhibits the same advantageous effects as those of FIG. 3.

In other words, in the example of FIG. 3, the front edge of the drive unit 106a (the edge opposite to the fixed edge 107a) faces the movable unit 103 when viewed from the center of the movable unit 103 in a plan view (i.e., when viewed from the fixed edge 107a in a plan view, the center of the movable unit 103 is farther from the fixed edge 107a (one edge of the drive unit 106a) than the other edge of the drive unit 106a). In such a case, the virtual line C is drawn to pass through the center of the movable unit 103 and be parallel to the rotation axis A of the movable unit 103.

Further, at least a part of the coupling portion D of the supporting unit 105a and the movable unit 103 is designed to be within the second region $R_2$ of two regions: the first region $R_1$ including the drive unit 106a and the second region $R_2$ without the drive unit 106a, which are divided by the virtual line C. This configuration prevents a reduction in resonance frequency and achieves an increase in scanning angle.

By contrast, in the example of FIG. 4, the edge of the drive unit 106a (the edge opposite to the fixed edge 107a) does not face the movable unit 103 when viewed from the center of the movable unit 103 in a plan view (i.e., when viewed from the fixed edge 107a in a plan view, the center of the movable unit 103 is closer to the fixed edge 107a (one edge of the drive unit 106a) than the other edge of the drive unit 106a). In such a case, the virtual line C is drawn to pass through the center of the movable unit 103 and be orthogonal to the rotation axis A of the movable unit 103.

Further, at least a part of the coupling portion D of the supporting unit 105a and the movable unit 103 is designed to be within the second region $R_2$ of two regions: the first region $R_1$ including the drive unit 106a and the second region $R_2$ without the drive unit 106a, which are divided by the virtual line C. This configuration prevents a reduction in resonance frequency and achieves an increase in scanning angle.

The light deflector 100 in FIG. 1 has point symmetry in a plan view. In a case that the light deflector 100 has line symmetry, the coupling portion D is deviated to one side from the center of the mirror unit 101, and the movable unit 103 fails to oscillate stably. The same applies to the light deflector according to the embodiments to be described below.

In the following modifications of a first embodiment of the present disclosure provide different coupling portions at which a supporting unit is coupled to a movable unit and different configurations of the supporting unit. In the following description of the modifications of the first embodiment, a description of the same components as those of the embodiment described above is omitted.

FIGS. 5 to 8 are illustrations of a position at which the supporting unit is coupled to the movable unit, according to different modifications. In the examples of FIGS. 5 to 8, although the fixed edge 107a is at the same position as in FIG. 4, the coupling portion of the supporting unit and the movable unit may be the same as in the examples of FIGS. 5 to 8 for the case that the fixed edge 107a is at the same position as in FIG. 3 as well.

Figure 5:
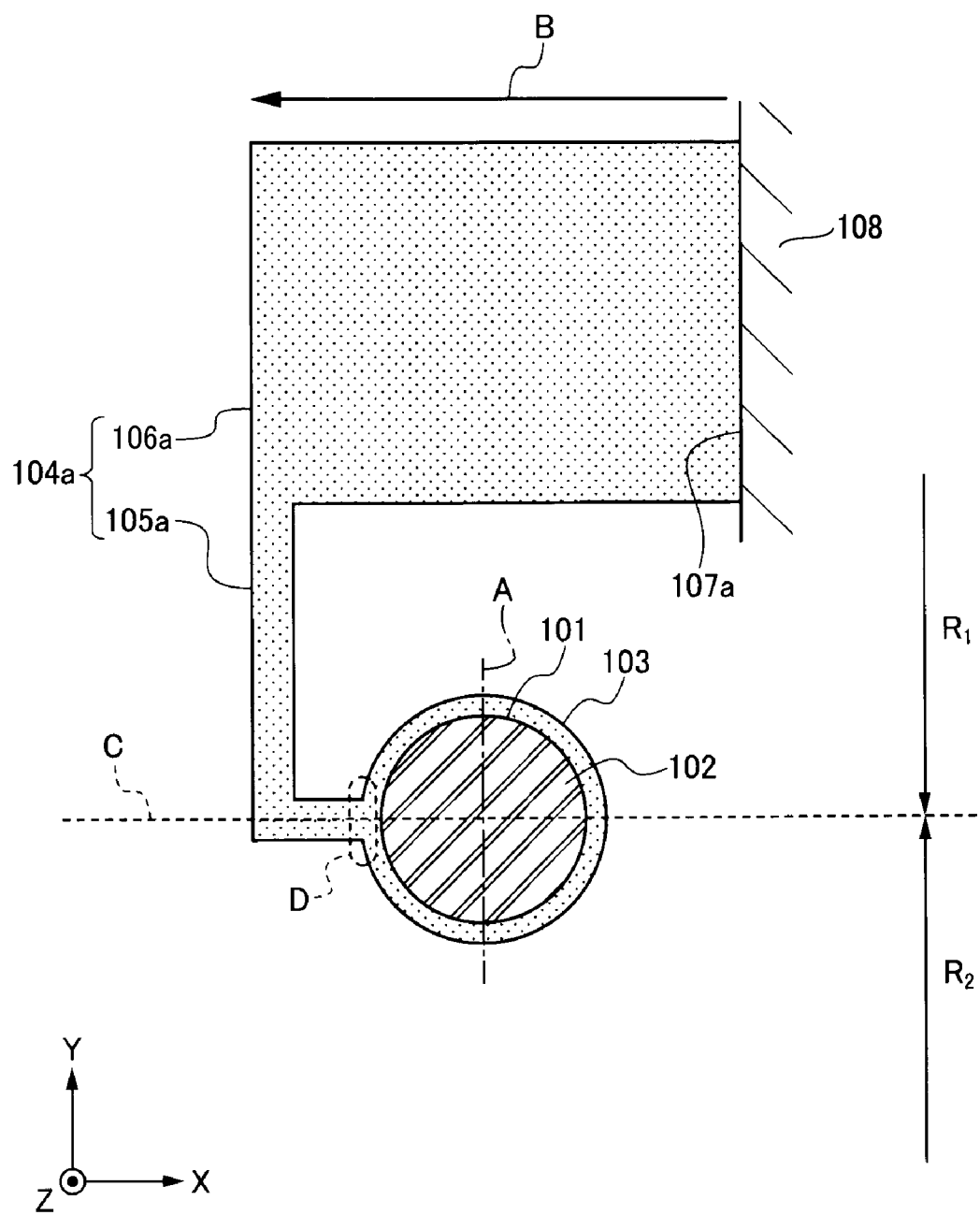
FIG. 5 is an illustration for describing a position at which the supporting unit is coupled to the movable unit, according to a modification of an embodiment of the present disclosure.

In FIGS. 3 and 4, the coupling portion D extends over the third quadrant and the fourth quadrant, whereas the coupling portion D extends over the second quadrant and the third quadrant in FIG. 5. In FIG. 5, the supporting unit 105a specifically has one bending portion with a bending angle of substantially 90°.

As illustrated in FIG. 3, the quadrants correspond to four planar areas divided by the virtual line C and a straight line E orthogonal to the virtual line C and passing through the center of the movable unit 103. The first quadrant corresponds to an area at the right of the straight line E and at the upper side of the virtual line C, and the second quadrant corresponds to an area at the left of the straight line E and at the upper side of the virtual line C. The third quadrant corresponds to an area at the left of the straight line E and at the lower side of the virtual line C, and the fourth quadrant corresponds to an area at the right of the straight line E and at the lower side of the virtual line C.

In the examples of FIGS. 4 to 16, the straight line E is aligned with the rotation axis A. In other words, in the examples of FIGS. 4 to 16, the first quadrant corresponds to an area at the right of the rotation axis A and at the upper side of the virtual line C, and the second quadrant corresponds to an area at the left of the rotation axis A and at the upper side of the virtual line C. The third quadrant corresponds to an area at the left of the rotation axis A and at the lower side of the virtual line C, and the fourth quadrant corresponds to an area at the right of the rotation axis A and at the lower side of the virtual line C.

Figure 6:
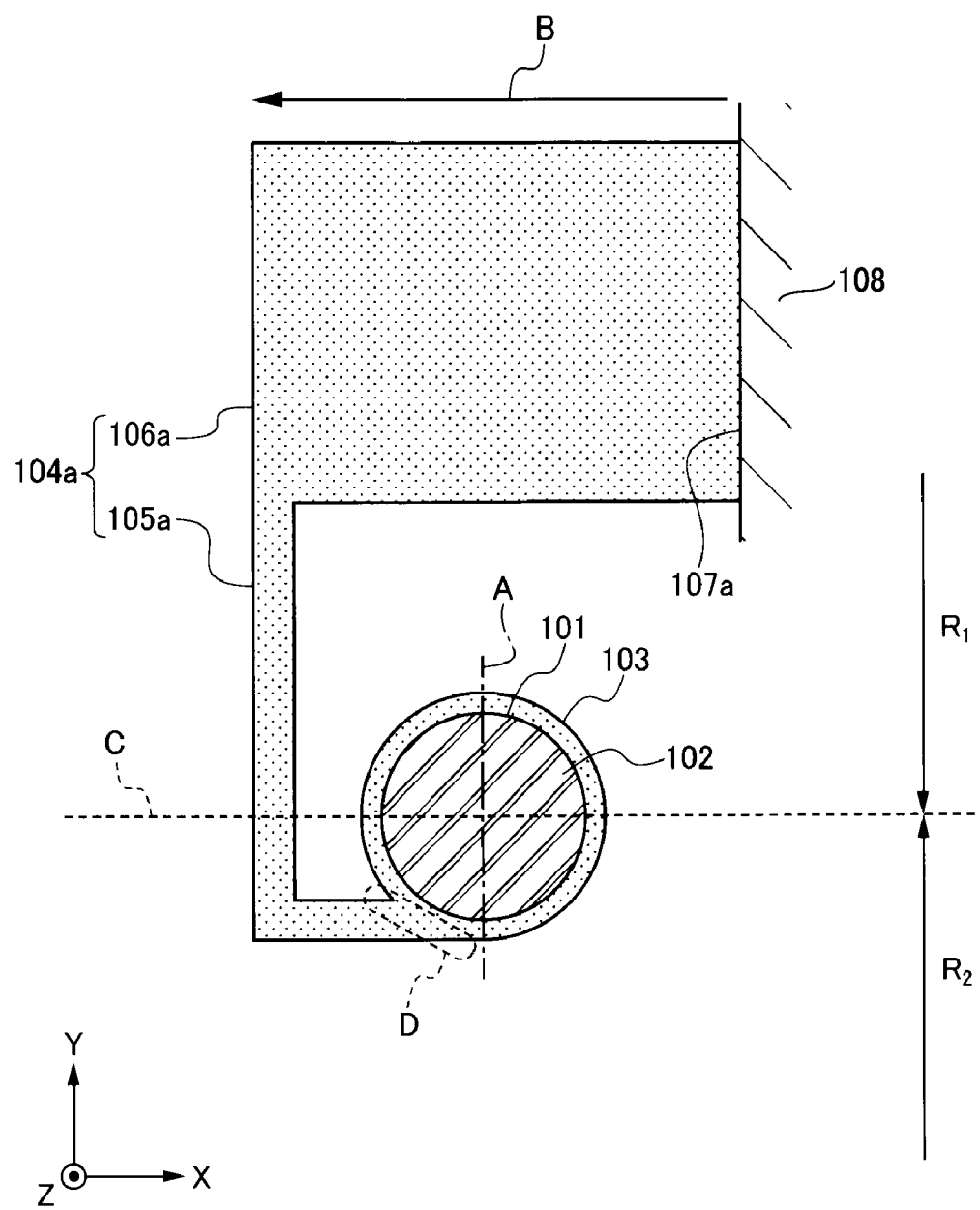
FIG. 6 is an illustration for describing a position at which the supporting unit is coupled to the movable unit, according to another modification of the embodiment of the present disclosure.
Figure 7:
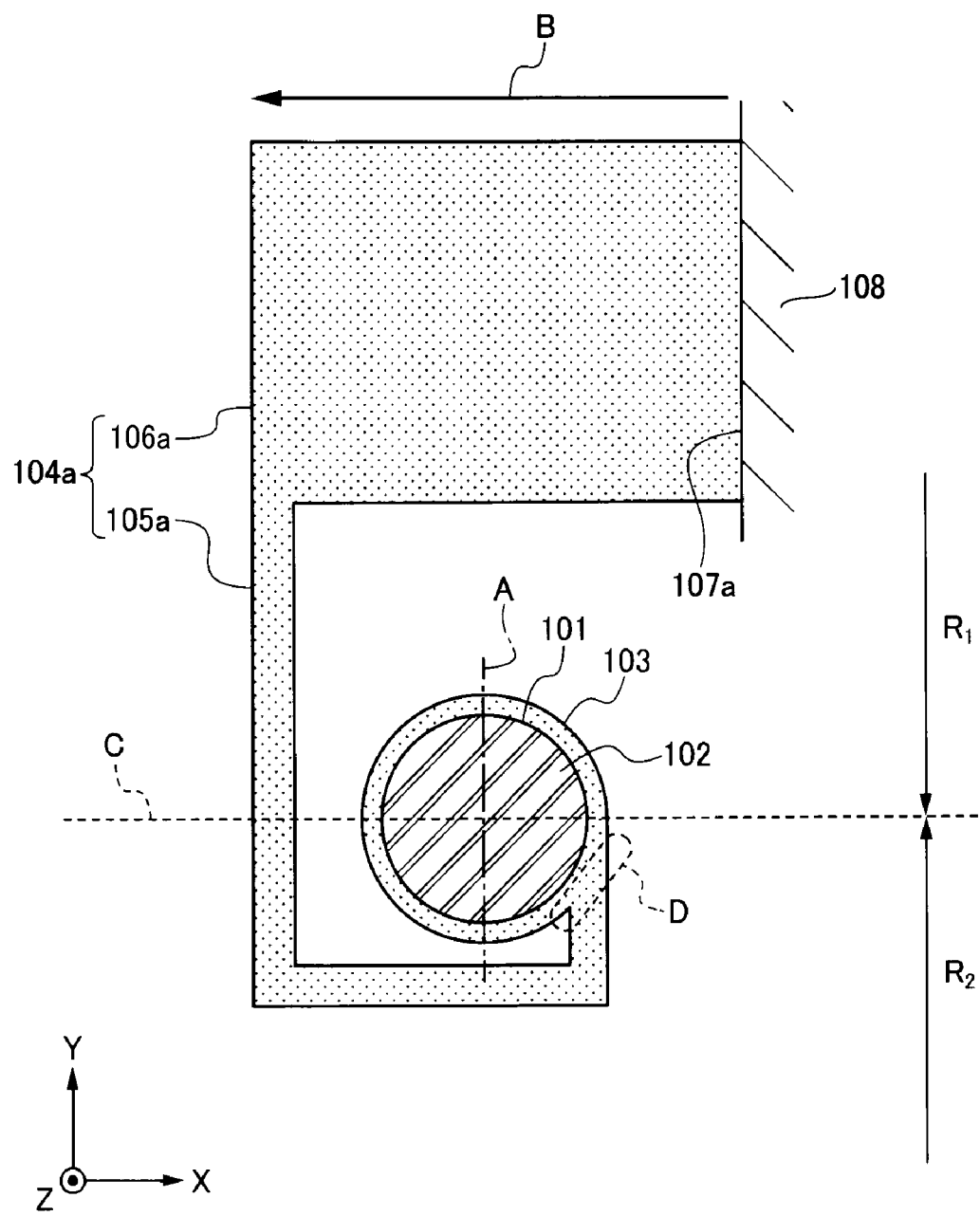
FIG. 7 is an illustration for describing a position at which the supporting unit is coupled to the movable unit, according to still another modification of the embodiment of the present disclosure.
Figure 8:
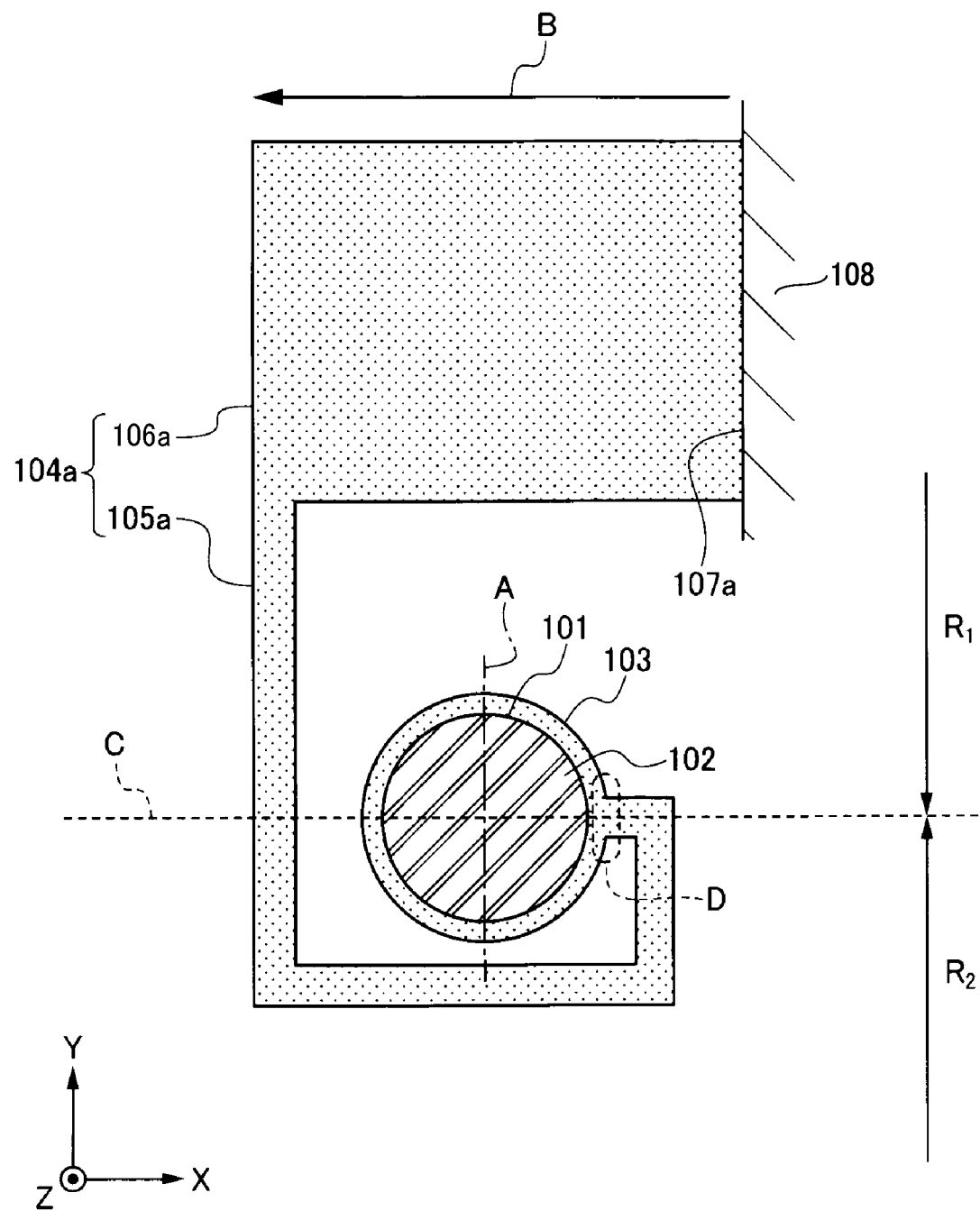
FIG. 8 is an illustration for describing a position at which the supporting unit is coupled to the movable unit, according to yet another modification of the embodiment of the present disclosure.

In the example of FIG. 6, the supporting unit 105a has one bending portion with a bending angle of substantially 90°, and the coupling portion D is within the third quadrant. In the example of FIG. 7, the supporting unit 105a has two bending portions with a bending angle of substantially 90°, and the coupling portion D is within the fourth quadrant. In other words, in a case that the first quadrant and a second quadrant are closer to the drive unit 106a than the other quadrans of the four planar areas, the supporting unit 105a is coupled to the movable unit 103 within a fourth quadrant. In the example of FIG. 8, the supporting unit 105a has three bending portions with a bending angle of substantially 90°, and the coupling portion D extends over the first quadrant and the fourth quadrant. In other words, in a case that the first quadrant and a second quadrant are closer to the drive unit 106a than the other quadrans of the four planar areas, the coupling portion D of the supporting unit 105a and the movable unit 103 extends over a first quadrant and a fourth quadrant. In the examples of FIGS. 5 and 8, a part of the coupling portion D is within the second region $R_2$.

As described above, in the example of FIG. 7, the coupling portion of the supporting unit 105a and the movable unit 103 is within the fourth quadrant, and in the example of FIG. 8, the coupling portion of the supporting unit 105a and the movable unit 103 extends over the first quadrant and the fourth quadrant. These configurations enable a longer supporting unit 105a, and are beneficial to an increase in scanning angle. The configuration of FIG. 8 enables a much longer supporting unit 105a, and more beneficial to an increase in scanning angle.

FIGS. 9 to 16 are illustrations of a supporting unit according to modifications of an embodiment of the present disclosure. In the examples of FIGS. 9 to 16, the cases in which the fixed edge 107a is at the same position as in FIG. 4. The supporting unit according to the modifications in FIGS. 9 to 16 may be applicable in the case that the fixed edge 107a is at the same position as in FIG. 3. In the examples of FIGS. 9 to 16, the supporting unit may be coupled to the movable unit at any of the positions as illustrated in FIGS. 5 to 8.

Figure 9:
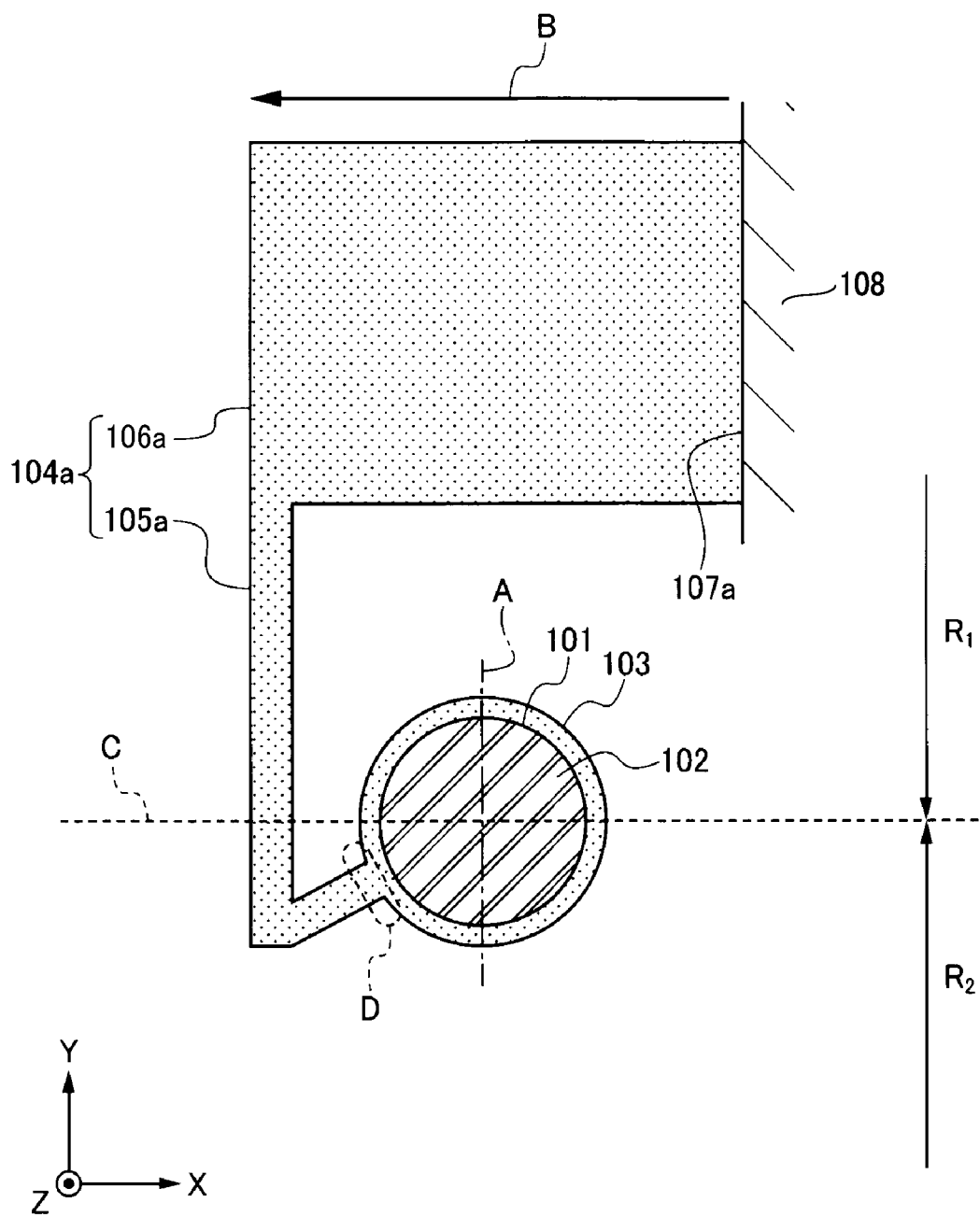
FIG. 9 is an illustration of the supporting unit according to a modification of an embodiment of the present disclosure.

As illustrated in FIG. 9, the supporting unit 105a includes a part extending obliquely to the X direction or the Y direction.

Figure 10:
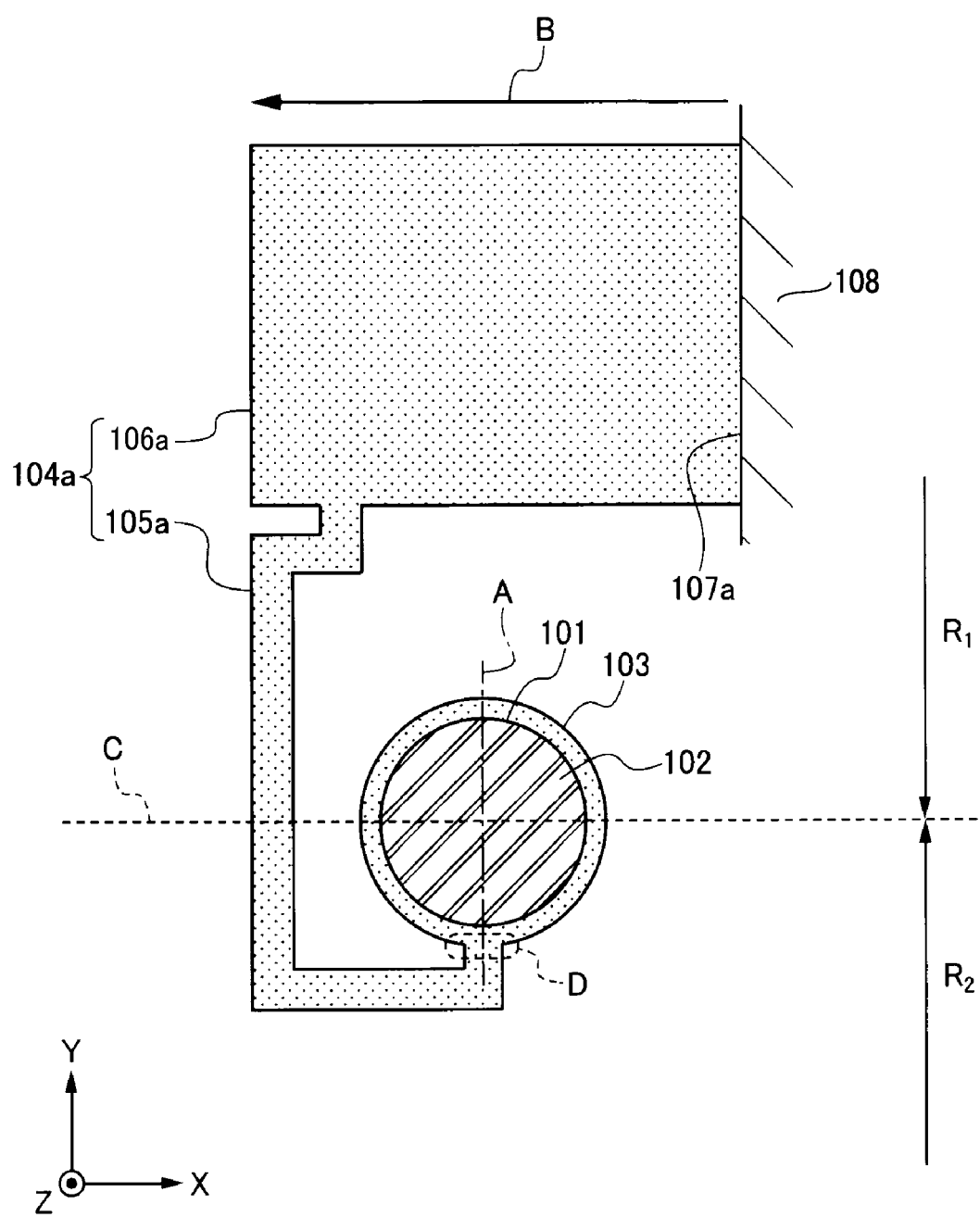
FIG. 10 is an illustration of the supporting unit according to another modification of the embodiment of the present disclosure.
Figure 11:
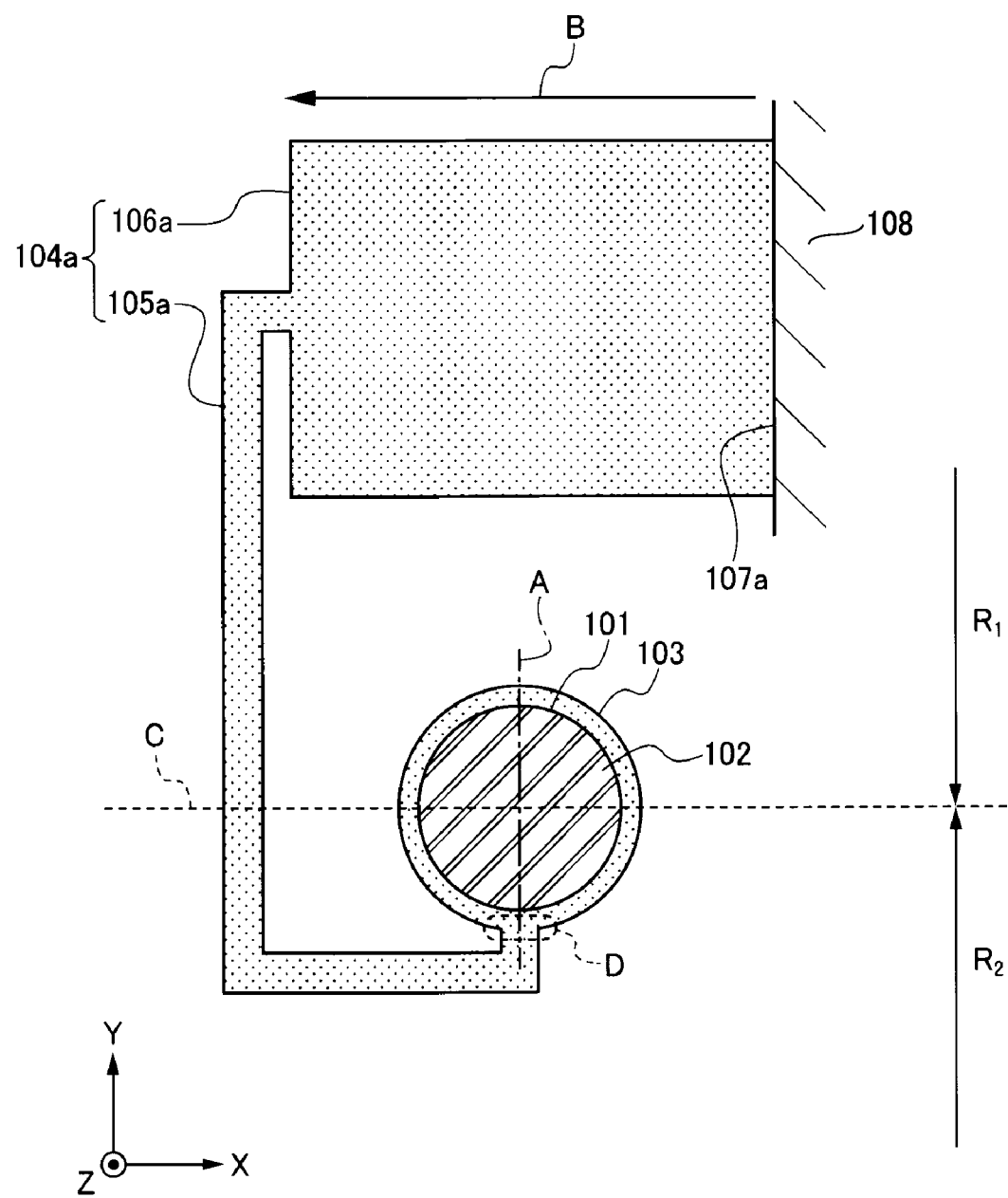
FIG. 11 is an illustration of the supporting unit according to still another modification of the embodiment of the present disclosure.
Figure 12:
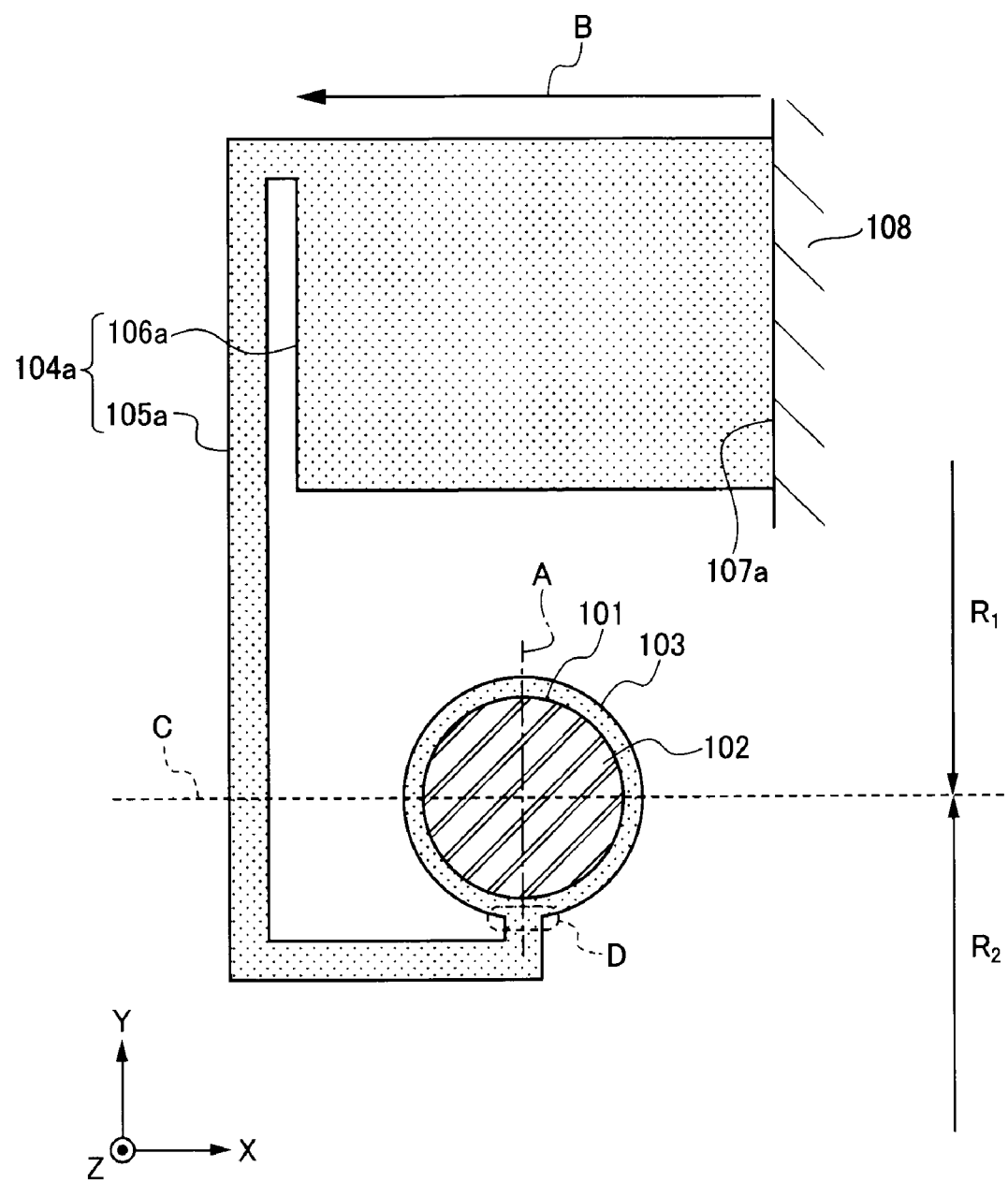
FIG. 12 is an illustration of the supporting unit according to yet another modification of the embodiment of the present disclosure.

Further, the supporting unit 105a may be coupled to the drive unit 106a at any position except the edge on the side orthogonal to the fixed edge 107a of the drive unit 106a as illustrated in FIG. 10, instead of the edge of the side orthogonal to the fixed edge 107a of the drive unit 106a as illustrated in FIG. 4. Alternatively, as illustrated in FIGS. 11 and 12, the supporting unit 105a may be coupled to the drive unit 106a at any position on the edge (i.e., the edge opposite to the fixed edge 107a) of the drive unit 106a.

However, when the supporting unit 105a is coupled to the drive unit 106a at the edge (i.e., the edge opposite to the fixed edge 107a) of the drive unit 106a, the drive unit 106a becomes longer in the direction indicated by arrow B (i.e., the direction of the length of the drive unit 106a), and this might reduce resonance frequency. The length of the drive unit 106a in the width direction is less likely to affect the resonance frequency than the length of the drive unit 106a in the direction of the length (i.e., the direction indicated by arrow B). In view of such circumstances, the supporting unit 105a is coupled to the drive unit 106a preferably at a position on the side orthogonal to the fixed edge 107a and close to the edge (i.e., the edge opposite to the fixed edge 107a) of the drive unit 106a.

Figure 13:
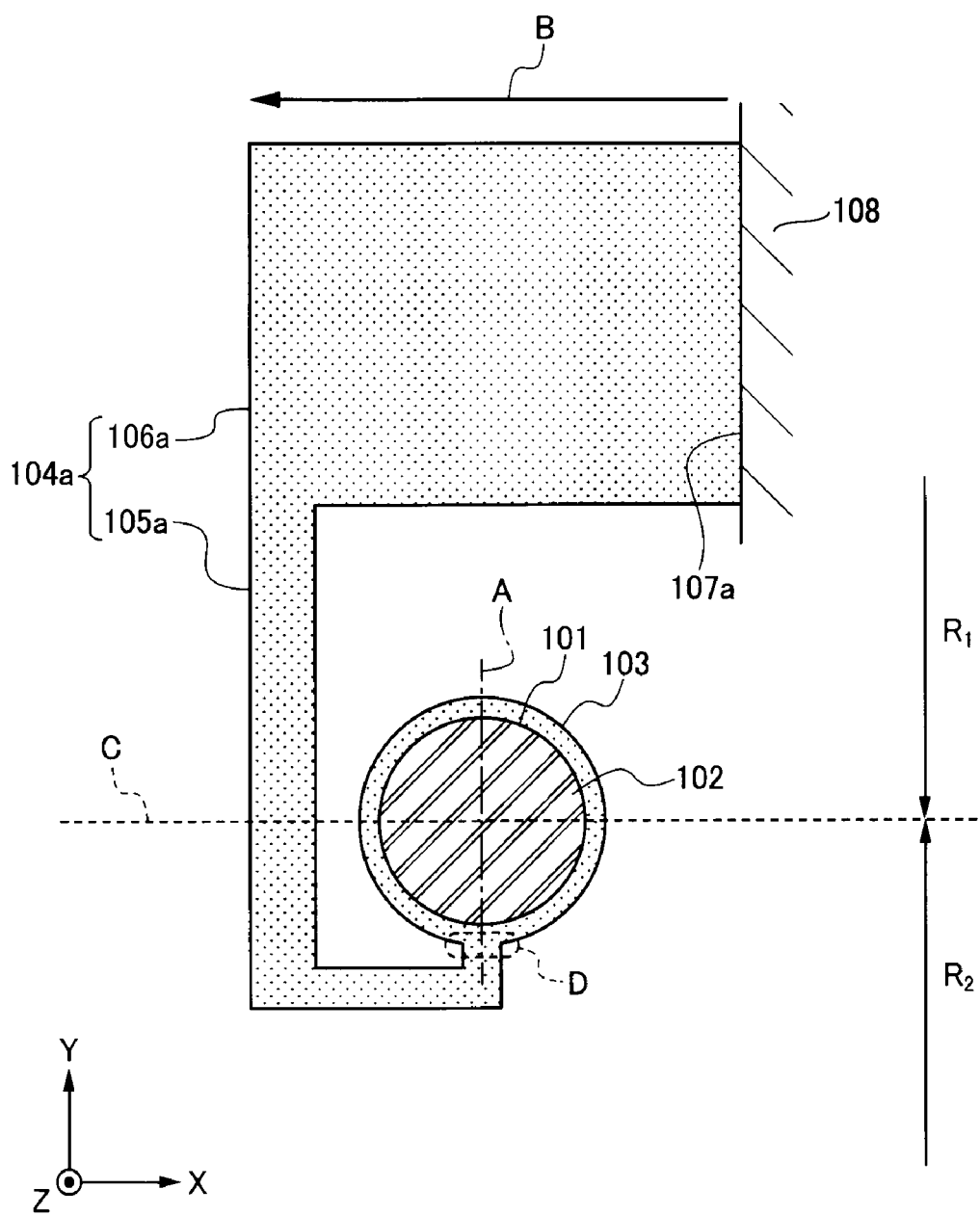
FIG. 13 is an illustration of the supporting unit according to further modification of the embodiment of the present disclosure.

As illustrated in FIG. 13, the width of the supporting unit 105a is not constant, and the supporting unit 105 has a portion with a width greater than a width of another portion. The supporting unit 105a, for example, is designed to be thick at a particularly low-strength part. This configuration prevents deterioration and failure of the first actuator 104a. The particularly low-strength part of the supporting unit 105a refers to, for example, a portion close to the drive unit 106a, to which a large stress is likely to be applied, in the supporting unit 105a.

Figure 14:
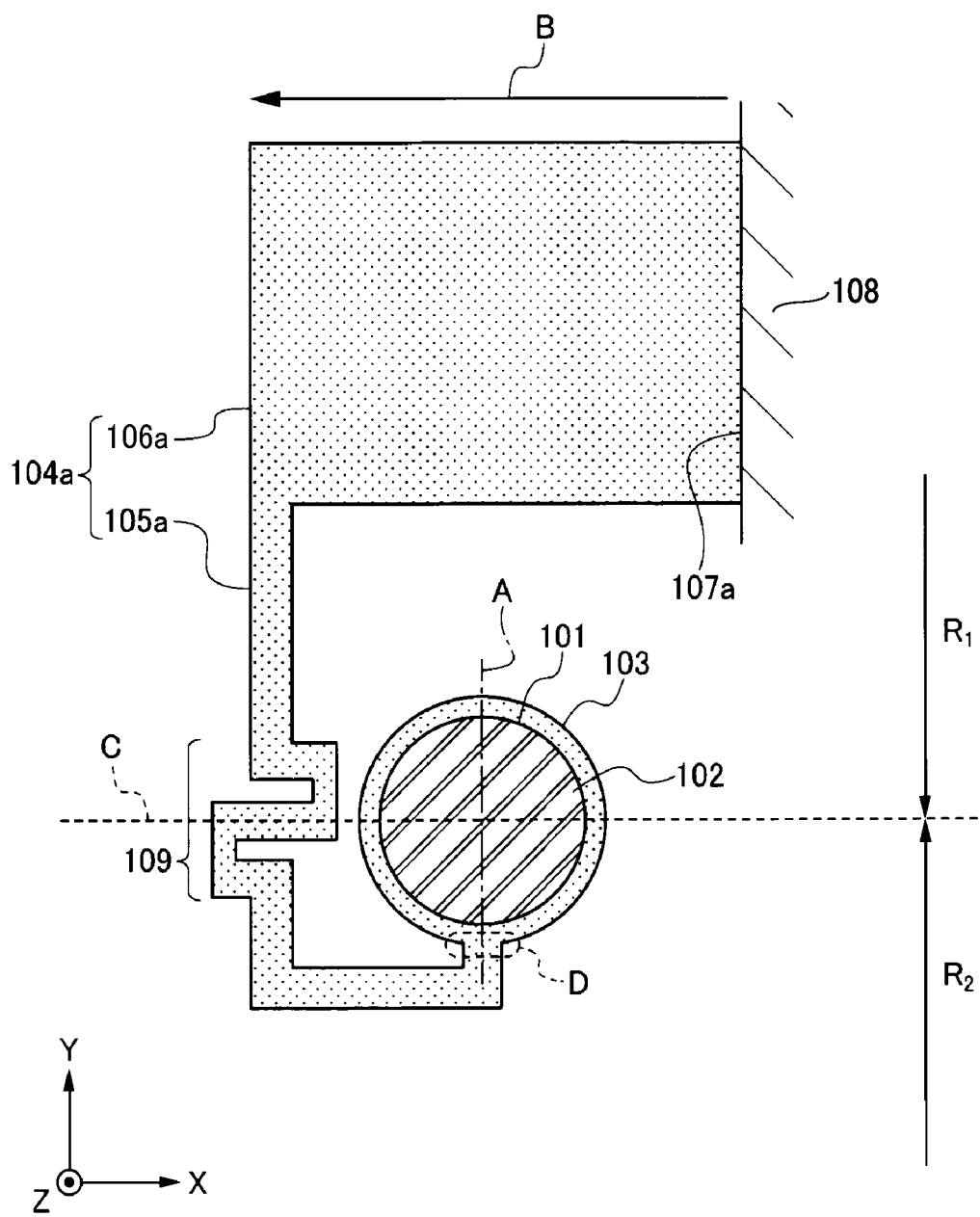
FIG. 14 is an illustration of the supporting unit according to still further modification of the embodiment of the present disclosure.

As illustrated in FIG. 14, the supporting unit 105a includes a meandering structure 109. This configuration reduces the rigidity of the supporting unit 105a and increases the scanning angle of the light deflector more.

Figure 15:
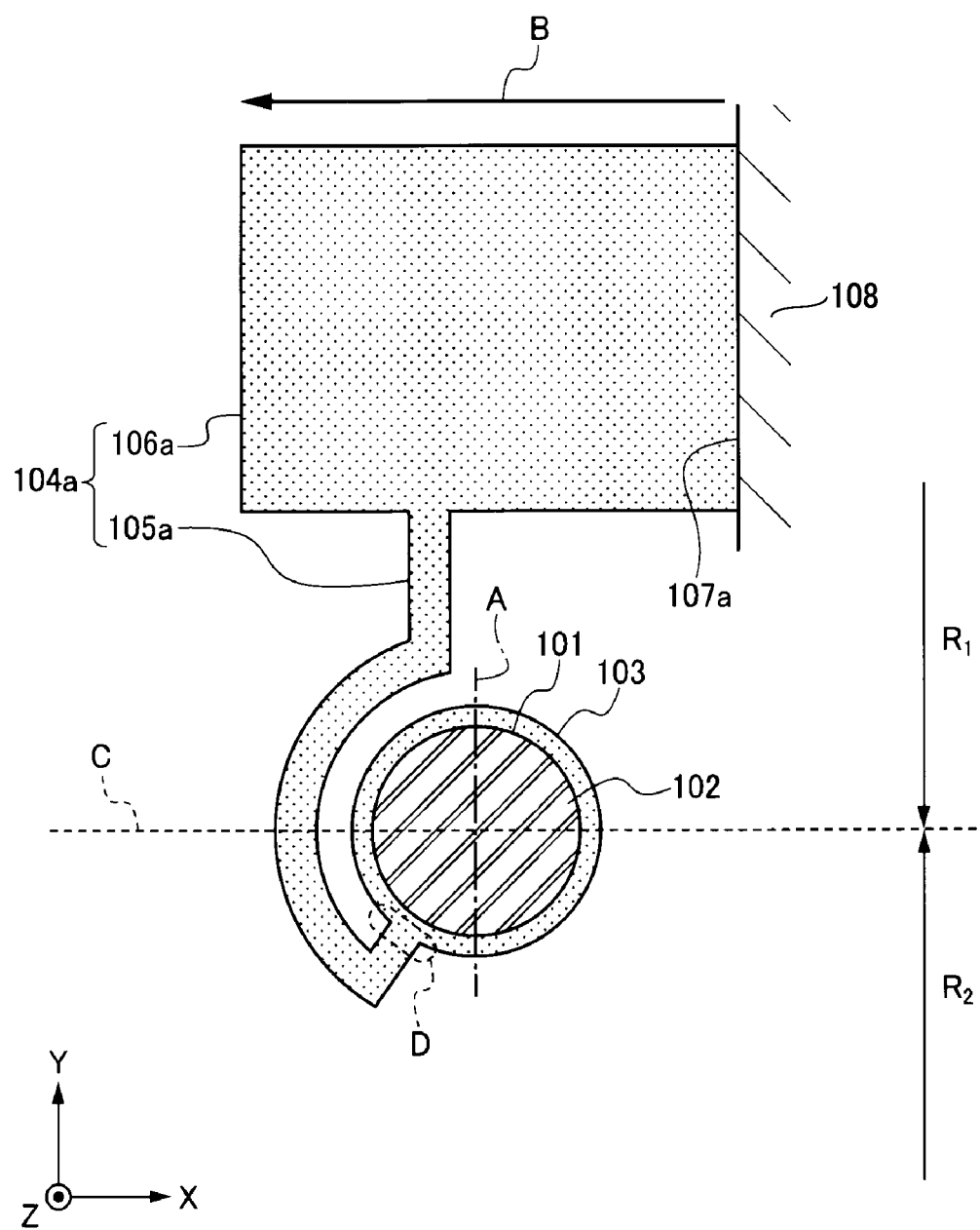
FIG. 15 is an illustration of the supporting unit according to yet further modification of the embodiment of the present disclosure.

As illustrated in FIG. 15, the supporting unit 105a includes a curved portion. The curved portion of the supporting unit 105a includes the shape of a segment of a circle (i.e., an arc) whose center is the center of the movable unit 103. In the example of FIG. 15, a gap having a substantially constant width is formed along the periphery of the movable unit 103, between the periphery of the movable unit 103 and the innermost circumference of the curved portion of the supporting unit 105a. The substantially constant width is intended to mean that production errors during the semiconductor manufacturing process is permissible. Such a shape of the supporting unit 105a including a segment of the circle with the center of the movable unit 103 can reduce dead space.

Figure 16:
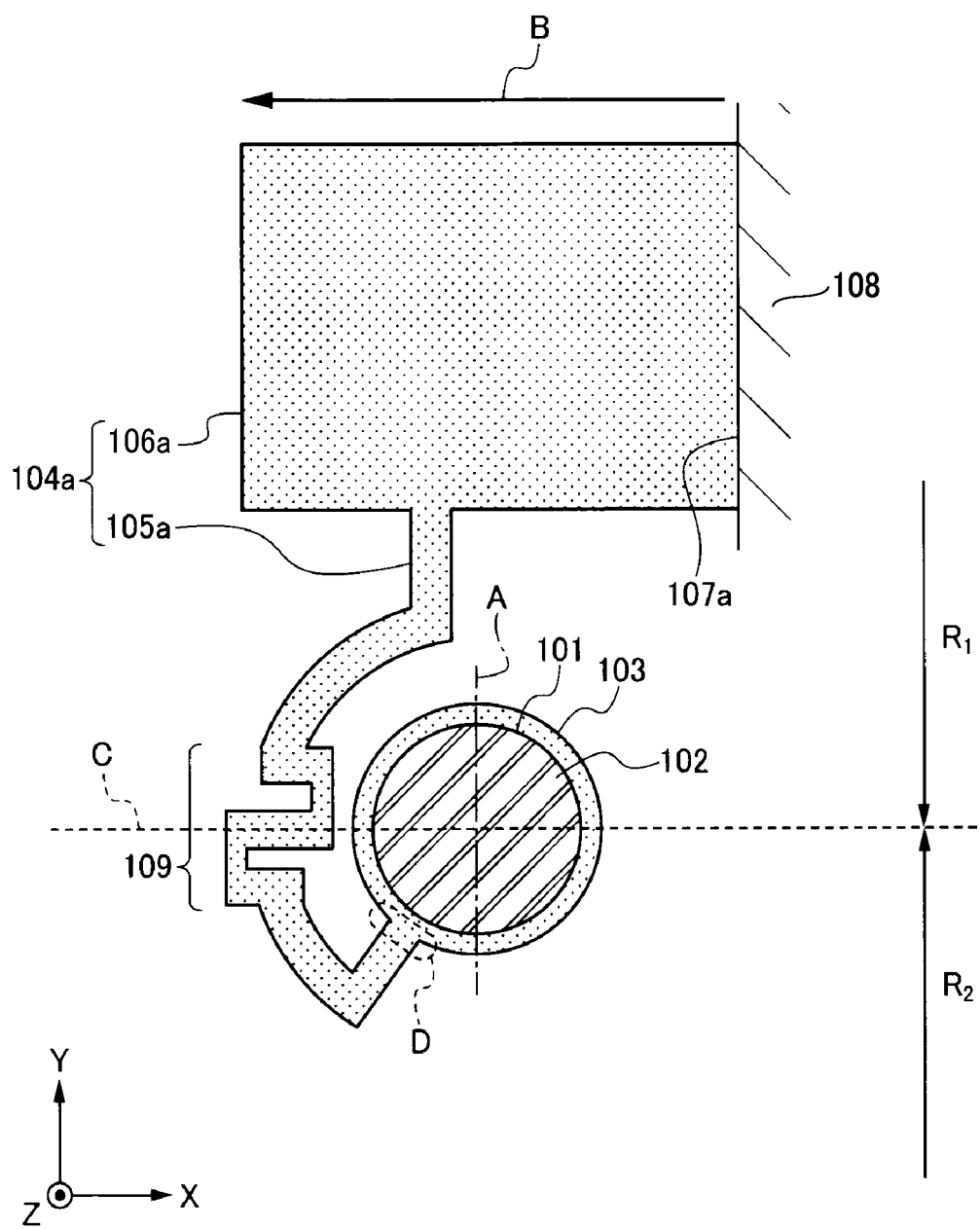
FIG. 16 is an illustration of the supporting unit according to even yet further modification of the embodiment of the present disclosure.

As illustrated in FIG. 16, the curved portion of the supporting unit 105a includes a meandering structure 109. This configuration reduces the rigidity of the supporting unit 105a and increases the scanning angle of the light deflector more.

If any object that reflects light is around the reflecting surface 102 of the movable unit 103, the reflected light becomes stray light that might interfere with reflected light desired at that location, and reduces a signal-to-noise ratio (S/N). As a result, a module using the light deflector 100 decreases in performance. In the case of an image projection device, image quality deteriorates. In the case of an optical inspection device, accuracy of detection decreases.

To avoid such situations, a space is provided around the reflecting surface 102 of the movable unit 103, at which any component is disposed, except near the coupling portion of the supporting unit 105a and the drive unit 106a. In other words, a gap having a substantially constant width is formed (extends) along the periphery of the movable unit 103, between the periphery of the movable unit 103 and the innermost circumference of the curved portion (i.e., the arc) of the supporting unit 105a. In addition to such an avoidance of stray light, the gap between the periphery of the movable unit 103 and the innermost circumference of the curved portion of the supporting unit 105a preferably has a constant width and is formed along the periphery of the movable unit 103, so as to reduce errors generated during the manufacturing process.

The second embodiment provides examples of the light deflector as a movable device, which are different from those of the first embodiment. In the present embodiment, the description of the same components as those of the embodiments described above is omitted.

Figure 17:
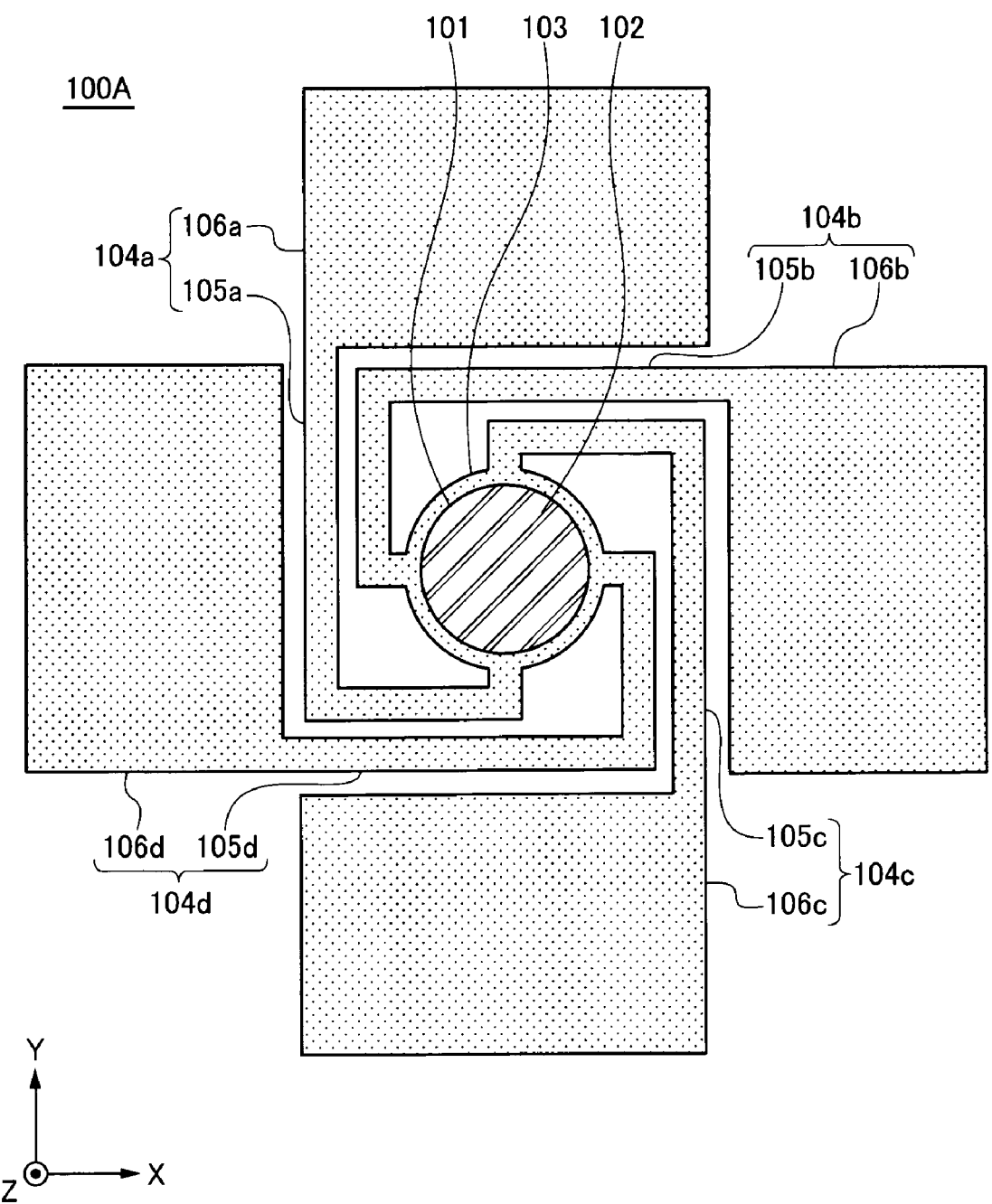
FIG. 17 is a plan view of the light deflector as a movable device according to another embodiment of the present disclosure.

FIG. 17 is a plan view of the light deflector as a movable device according to a second embodiment of the present disclosure. The light deflector 100A in FIG. 17 includes a movable unit 103, a first actuator 104a, a second actuator 104b, a third actuator 104c, and a fourth actuator 104d. The light deflector 100A is a four-phase light deflector adapted for the vector scanning involving deflecting incident light in multi-axial directions using the oscillation of the movable unit 103.

In the light deflector 100A in FIG. 17, the movable unit 103 is supported by the first actuator 104a, the second actuator 104b, the third actuator 104c, and the fourth actuator 104d to be rotatable.

The first actuator 104a, the second actuator 104b, the third actuator 104c, and the fourth actuator 104d cause the movable unit 103 to oscillate. The fourth actuator 104d has the same structure as those of the first actuator 104a, the second actuator 104b, and the third actuator 104c, and includes a supporting unit 105d and a drive unit 106d.

In the example of FIG. 17, the light deflector 100A includes four actuators. In this case as well, a reduction in resonance frequency can be prevented and an increase in scanning angle is achieved by coupling each supporting section to the movable unit at any position according to the first embodiment. In the light deflector 100A, the position of the coupling portion of each supporting unit and the movable unit, and the configuration of each supporting unit may be modified as described in the first embodiment.

Figure 18:
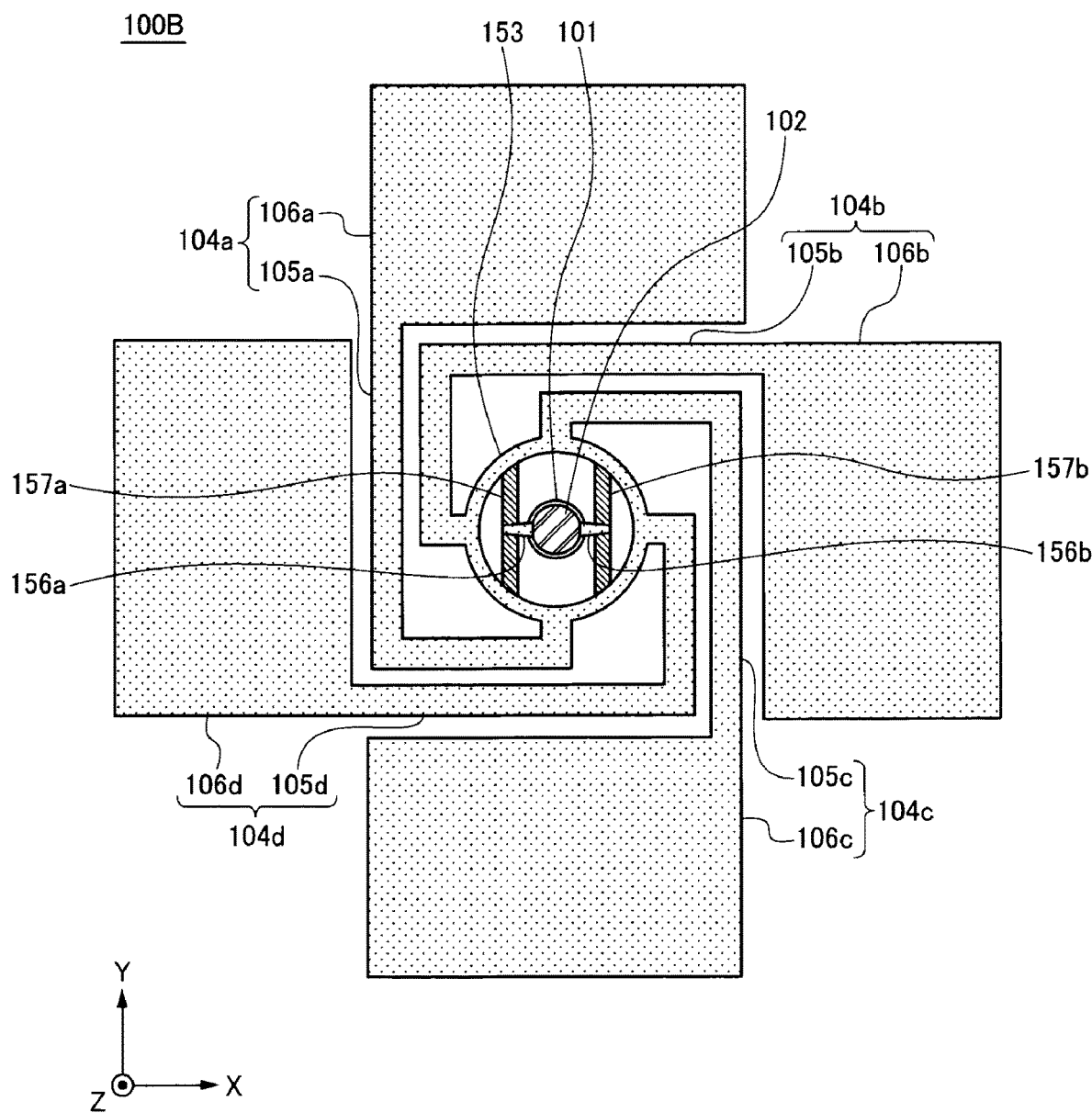
FIG. 18 is a plan view of the light deflector as a movable device according to a modification of the embodiment of the present disclosure.

FIG. 18 is a plan view of a light deflector as a movable device according to another modification of the second embodiment of the present disclosure. The four-phase light deflector may have the configuration in FIG. 18. In a light deflector 100B in FIG. 18, the movable unit 153 including a mirror unit 101 and a reflecting surface 102 is supported by a first actuator 104a, a second actuator 104b, a third actuator 104c, and a fourth actuator 104d to be rotatable.

Movable beams 157a and 157b facing each other with the mirror unit 101 disposed therebetween are disposed to lie across the inner region of a frame-shaped movable unit 153. A torsion bar 156a extends from the substantially center of the movable beam 157a in a direction (i.e., the X direction) substantially orthogonal to the movable beam 157a, and a torsion bar 156b extends from the substantially center of the movable beam 157b in a direction (i.e., the X direction) substantially orthogonal to the movable beam 157b. The torsion bar 156a and the torsion bar 156b support the mirror unit 101.

In at least one embodiment, the mirror unit 101 is supported by the movable beams 157a and 157b to undergo resonant actuation. When the torsion bars 156a and 156b each have a resonance frequency of approximately 20 kilohertz (kHz) during the torsion, for example, a drive signal corresponding to a resonance frequency near approximately 20 kHz is input to piezoelectric drive units on the +Z surfaces of the movable beams 157a and 157b coupled to the torsion bars 156a and 156b, respectively.

In response to the received signal, the movable beams 157a and 157b oscillate, and the oscillation of the movable beams 157a and 157b produce mechanical resonance and twist the torsion bars 156a and 156b. Thus, the movable beams 157a and 157b cause the mirror unit 101 to oscillate about the rotation axis parallel to the X direction. The oscillation of the mirror unit 101 about the rotation axis parallel to the X direction may be combined with the oscillation about the multi-axis directions caused by the first actuator 104a, the second actuator 104b, the third actuator 104c, and the fourth actuator 104d.

Figure 19:
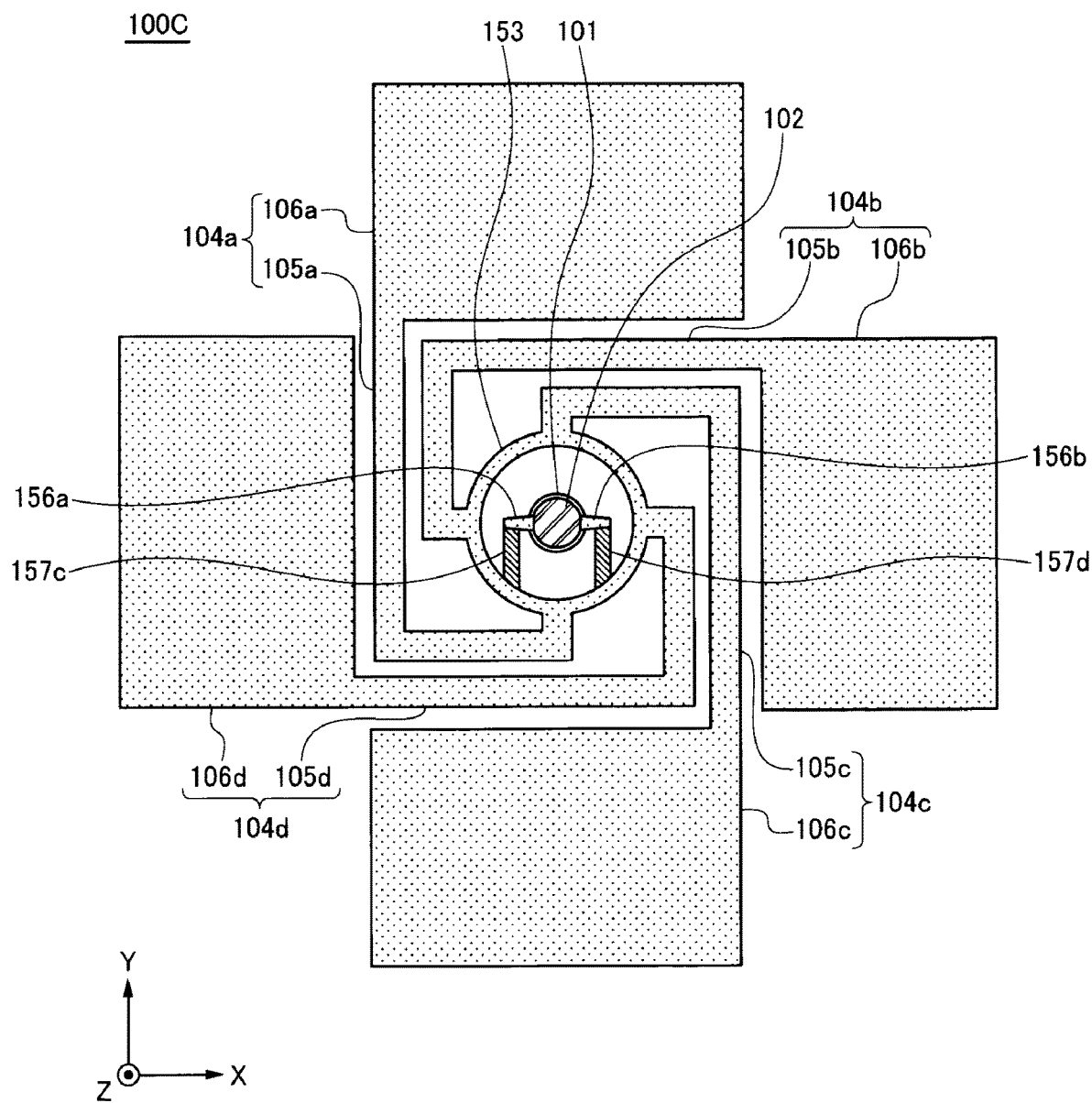
FIG. 19 is a plan view of the light deflector as a movable device according to another modification of the embodiment of the present disclosure.

In a light deflector 100c in FIG. 19, a movable unit 153 has a cantilever structure with movable beams 157c and 157d to resonantly actuate the mirror unit 101.

Figure 20:
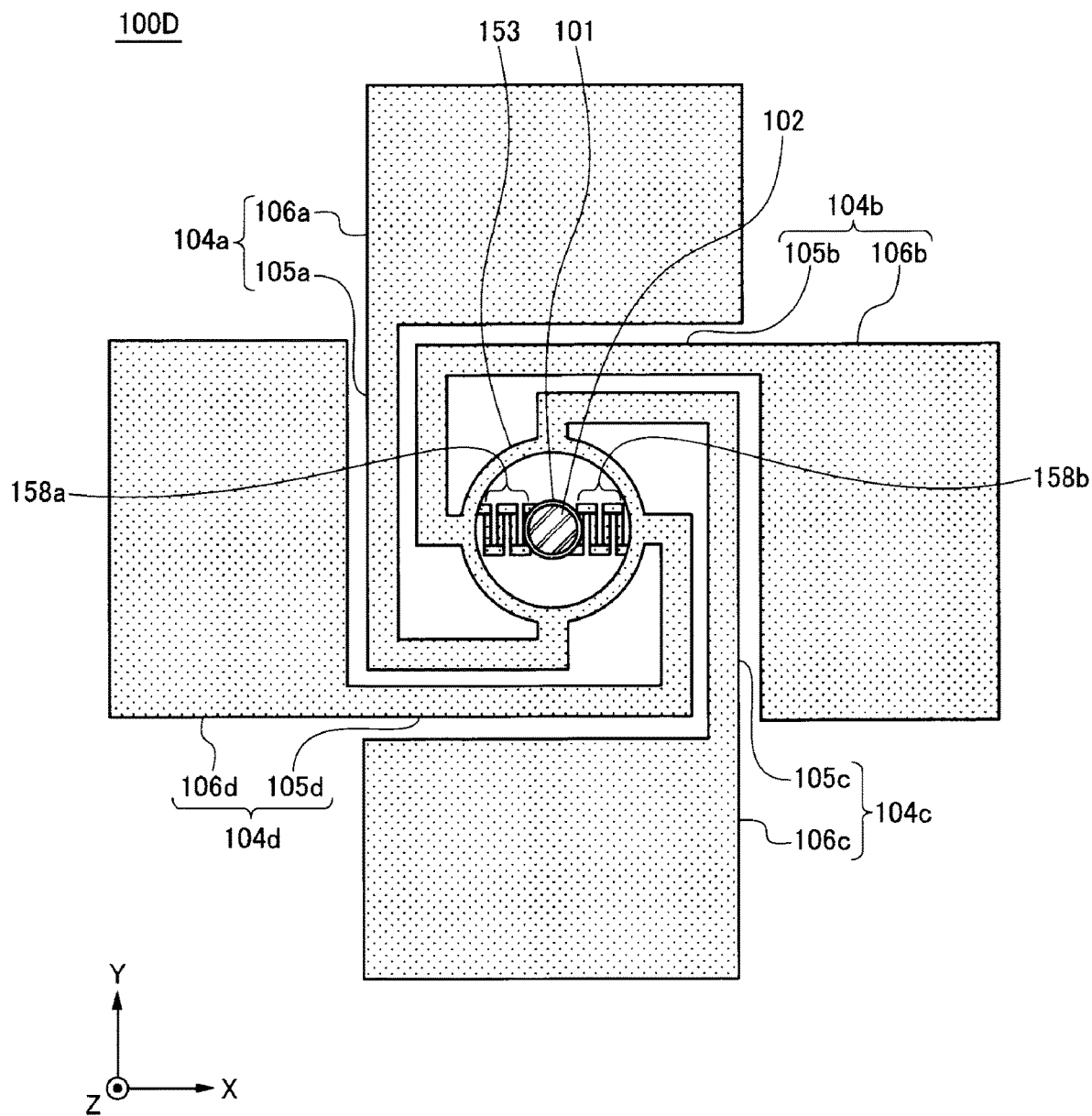
FIG. 20 is a plan view of the light deflector as a movable device according to still another modification of the embodiment of the present disclosure.

In a light deflector 100D of FIG. 20, a movable unit 153 includes two meandering structures 158a and 158b each supporting the mirror unit 101. In the example of the light deflector 100D, the two meandering structures 158a and 158b each have one end coupled to the inner surface of the movable unit 153 and the other end coupled to the periphery of the mirror unit 101. The two meandering structures 158a and 158b face each other with the mirror unit 101 therebetween and support the mirror unit 101 from the respective sides to allow a resonant actuation of the mirror unit 101.

Figure 21:
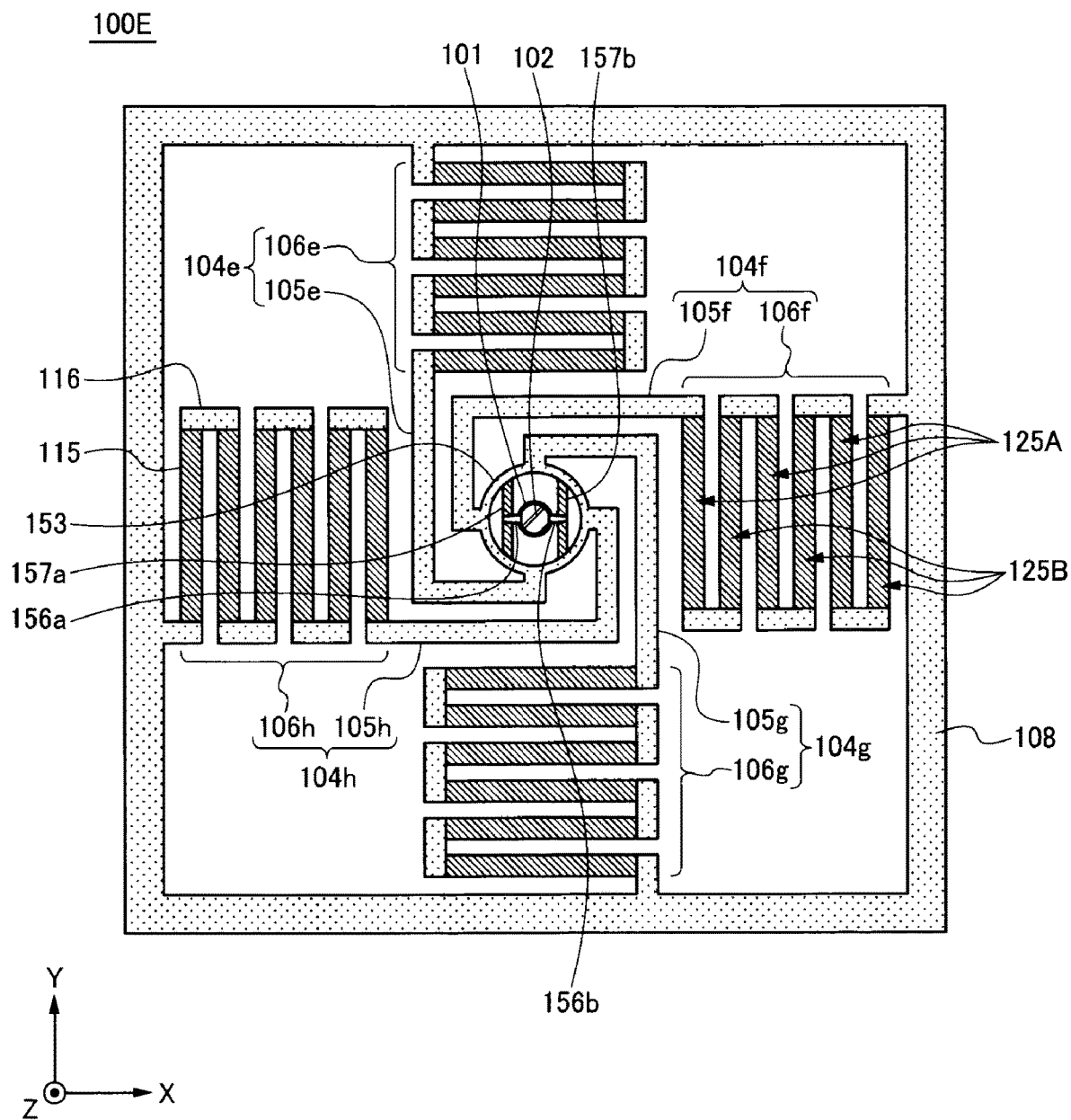
FIG. 21 is a plan view of the light deflector as a movable device according to yet another modification of the embodiment of the present disclosure.

In a light deflector 100E as illustrated in FIG. 21, a drive unit of each actuator may have a meandering structure. In the light deflector 100E in FIG. 21, the movable unit 153 is supported by a first actuator 104e, a second actuator 104f, a third actuator 104g, and a fourth actuator 104h to be rotatable.

The first actuator 104e, the second actuator 104f, the third actuator 104g, and the fourth actuator 104h cause the movable unit 153 to oscillate. The first actuator 104e include a supporting unit 105e and a drive unit 106e. The second actuator unit 104f has a supporting unit 105f and a drive unit 106f. The third actuator unit 104g has a supporting unit 105g and a drive unit 106g. The fourth actuator unit 104h has a supporting unit 105h and a drive unit 106h.

The first actuator 104e, the second actuator 104f, the third actuator 104g, and the fourth actuator 104h have the same structure. To avoid redundant description, the structure of the first actuator 104e is described below, and the description of those of the second actuator 104f, the third actuator 104g, and the fourth actuator 104h are omitted.

In the first actuator 104e, the supporting unit 105e has one end coupled to the movable unit 153 and the other end coupled to the drive unit 106e to support the movable unit 153. The supporting unit 105e is not straight and includes a bending portion. In the example of FIG. 21, the supporting unit 105e has two bending portions each with a bending angle of substantially 90°.

In the first actuator portion 104e, the drive unit 106e has one end coupled to the other end of the supporting unit 105e and the other end coupled to the stationary part 108 to cause the movable unit 153 to oscillate through the supporting unit 105e. The drive unit 106e has a meandering structure. In the example of FIG. 21, the piezoelectric actuation is used to actuate the supporting unit 105e using the drive unit 106e. In the example of FIG. 21, the stationary part 108 is frame-shaped. However, this is only one example.

The drive unit 106e includes a plurality of elongated beams 115 arranges at prescribed intervals and couplers 116 each coupling adjacent beams 115. The adjacent beams 115 are alternately coupled by the couplers 116 to turn and form a meandering structure.

Piezoelectric drive units 125A and piezoelectric drive units 125B are alternately provided on the +Z surfaces of the beams 115, respectively. Applying voltage signals to the piezoelectric drive units 125A and 125B cause the movable unit 153 including the mirror unit 101 to oscillate. The cross-sectional structure of the piezoelectric drive units 125A and 125B is as illustrated in FIG. 2.

The meandering structure of each drive unit in the light deflector 100E of FIG. 21 effectively accumulates displacements of a plurality of beams and increases the scanning angle more.

In the light deflectors as illustrated in FIGS. 18 to 21, the direction of the rotation axis about which the mirror unit 101 is caused to oscillate by the movable beams 157a and 157b is not limited those as illustrated in FIGS. 18 to 21. In some examples, the movable beams 157a and 157b are arranged to have the longitudinal direction parallel to the X-axis (i.e., the X direction), and the mirror unit 101 oscillates about the rotation axis parallel to the Y direction.

In the light deflector as illustrated in FIGS. 18 to 21, each supporting unit is coupled to the movable unit at any position according to the first embodiment to prevent a reduction in resonance frequency and increase a scanning angle. The position of the coupling portion of each supporting unit and the movable unit, and the configuration of each supporting unit may be modified as described in the first embodiment.

The light deflector according to the embodiments described above is applicable in an optical scanning system, a light deflection system, an image projection device, an optical writing device, an object recognition device, a laser head lamp, and a head mount display (HMD). These applications are described in sequence below.

With initially reference to FIGS. 22 to 25, an optical scanning system to which a movable device according to an embodiment of the present disclosure is applied is described below in detail.

Figure 22:
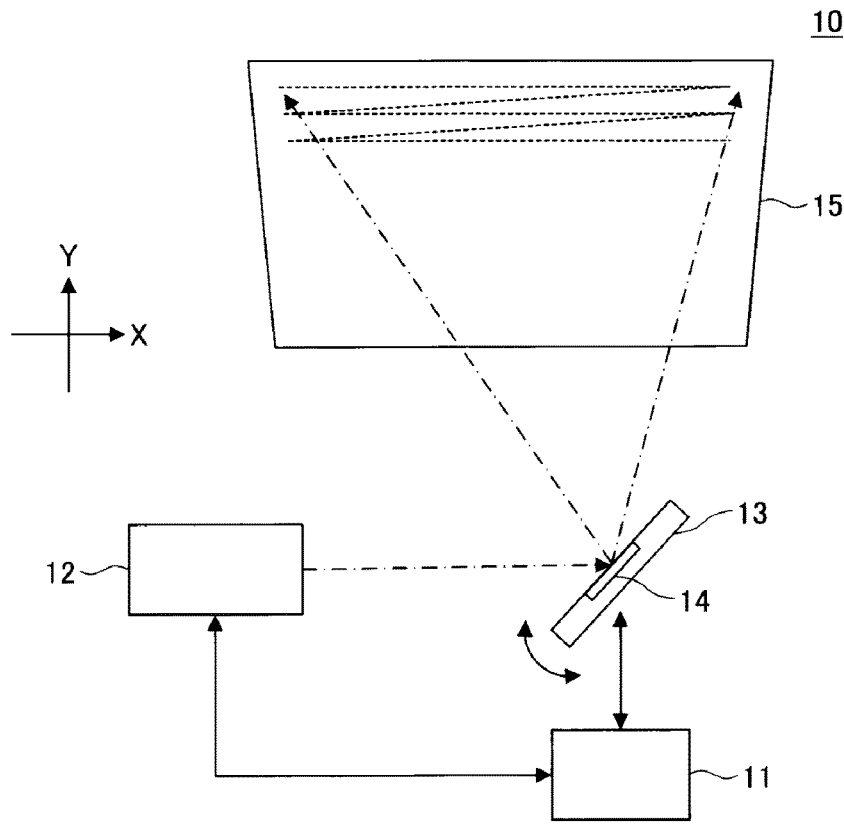
FIG. 22 is a schematic view of an example of an optical scanning system.

FIG. 22 is a schematic view of an example of an optical scanning system 10. As illustrated in FIG. 22, the optical scanning system 10 deflects light emitted from a light-source device 12 under the control of a control device 11, by using a reflecting surface 14 included in the movable device 13, so as to optically scan a target surface 15 to be scanned (hereinafter, referred to as target surface).

The optical scanning system 10 includes the control device 11, the light-source device 12, and the movable device 13 including the reflecting surface 14.

For example, the control device 11 is an electronic circuit unit provided with a central processing unit (CPU) and a field-programmable gate array (FPGA). For example, the movable device 13 is provided with a reflecting surface 14, and the movable device 13 serves as a micro-electromechanical system (MEMS) that is capable of moving the reflecting surface 14. The light-source device 12 is, for example, a laser device that emits a laser beam. The target surface 15 is, for example, a screen.

The control device 11 generates control instructions of the light-source device 12 and the movable device 13 using acquired optical-scanning information, and outputs drive signals to the light-source device 12 and the movable device 13 in accordance with the control instructions.

The light-source device 12 emits light in accordance with the received drive signal. The movable device 13 moves the reflecting surface 14 in at least one of a uniaxial direction and a biaxial direction, in accordance with the received drive signal.

With this configuration, for example, the reflecting surface 14 of the movable device 13 is biaxially moved in a reciprocating manner within a predetermined range, and the light emitted from the light-source device 12 to be incident on the reflecting surface 14 is uniaxially deflected to perform optical scanning, under the control of the control device 11, which is based on image data that is an example of the optical-scanning information. Accordingly, an image can be projected onto the target surface 15 as desired. The details of the movable device of the present embodiment and the details of the control by the control device are described later.

Figure 23:
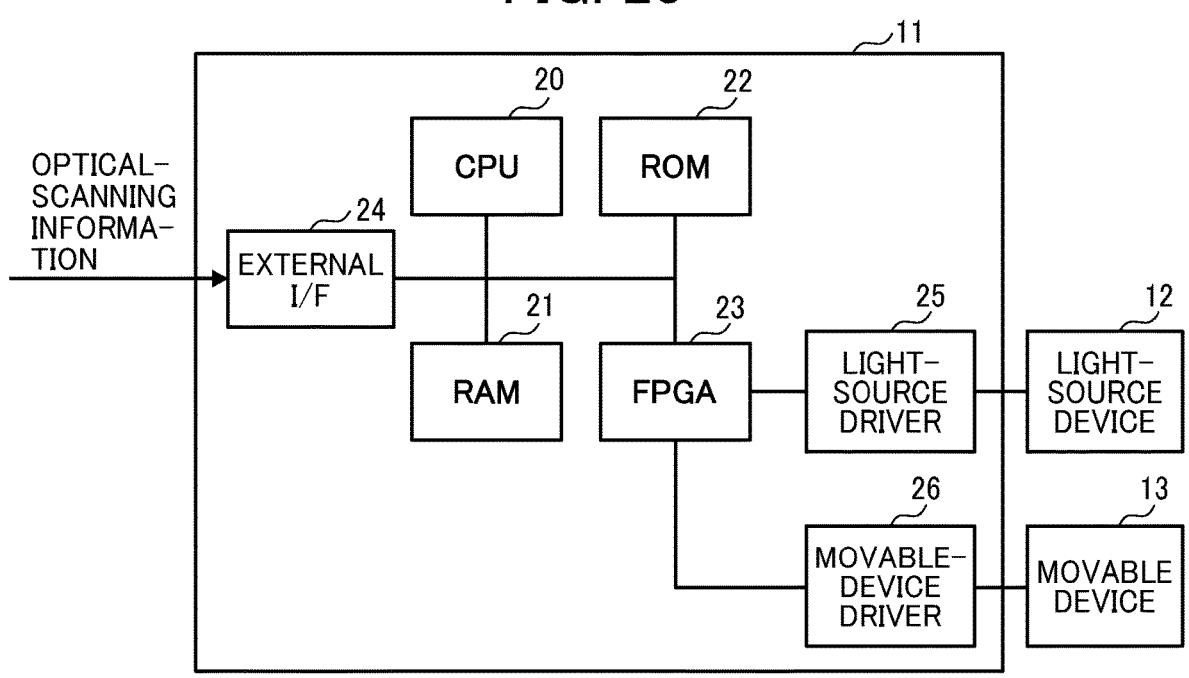
FIG. 23 is a hardware block diagram of the optical scanning system according to an embodiment of the present disclosure.

Next, the hardware configuration of an example of the optical scanning system 10 is described referring to FIG. 23. FIG. 23 is a hardware block diagram of an example of the optical scanning system. As illustrated in FIG. 23, the optical scanning system 10 includes the control device 11, the light-source device 12, and the movable device 13, which are electrically connected to one another. The control device 11 includes a central processing unit (CPU) 20, a random access memory (RAM) 21, a read only memory (ROM) 22, a field-programmable gate array (FPGA) 23, an external interface (I/F) 24, a light-source driver 25, and a movable-device driver 26.

The CPU 20 is an arithmetic device that loads into the RAM 21 a program or data from a storage device such as the ROM 22 and executes processing to provide the controls or functions of the entirety of the control device 11.

The RAM 21 is a volatile storage device that temporarily holds a program and data.

The ROM 22 is a non-volatile storage device that stores a program or data even after the power is turned off, and stores a program or data for processing that is executed by the CPU 20 to control each function of the optical scanning system 10.

The FPGA 23 is a circuit that outputs proper control signals to the light-source driver 25 and the movable-device driver 26 in accordance with the processing performed by the CPU 20.

For example, the external I/F 24 is an interface with respect to an external device or a network. The external device includes, for example, a host device such as a PC (Personal Computer), and a storage device such as a USB memory, an SD card, a CD, a DVD, an HDD, and an SSD. For example, the network may be a controller area network (CAN) of a vehicle, a local area network (LAN), and the Internet. The external I/F 24 can have any configuration that can achieve connection to an external device or communication with an external device. The external I/F 24 may be provided for each external device.

The light-source driver 25 is an electric circuit that outputs a drive signal such as a drive voltage to the light-source device 12 in accordance with the received control signal.

The movable-device driver 26 is an electric circuit that outputs a drive signal such as a drive voltage to the movable device 13 in accordance with the received control signal.

In the control device 11, the CPU 20 acquires optical-scanning information from an external device or a network through the external I/F 24. Note that any configuration may be used as long as the CPU 20 can acquire the optical scanning information, and the optical scanning information may be stored in the ROM 22 or in the FPGA 23 in the control device 11, or a storage device such as an SSD may be newly provided in the control device 11 and the optical scanning information may be stored in the storage device.

In this case, the optical-scanning information is information indicating the way of optical scanning to be performed on the target surface 15. For example, the optical-scanning information is image data when an image is displayed by optical scanning. For another example, the optical-scanning information is writing data indicating the order and portion of writing when optical writing is performed by optical scanning. Furthermore, for example, the optical scanning information is irradiation data indicating the timing and range of irradiation of light for object recognition in a case where an object is to be recognized by optical scanning.

The control device 11 has the hardware configuration in FIG. 23, and the components of the hardware configuration operate in accordance with instructions from the CPU 20 to implement the capabilities of the functional configuration as described below.

Figure 24:
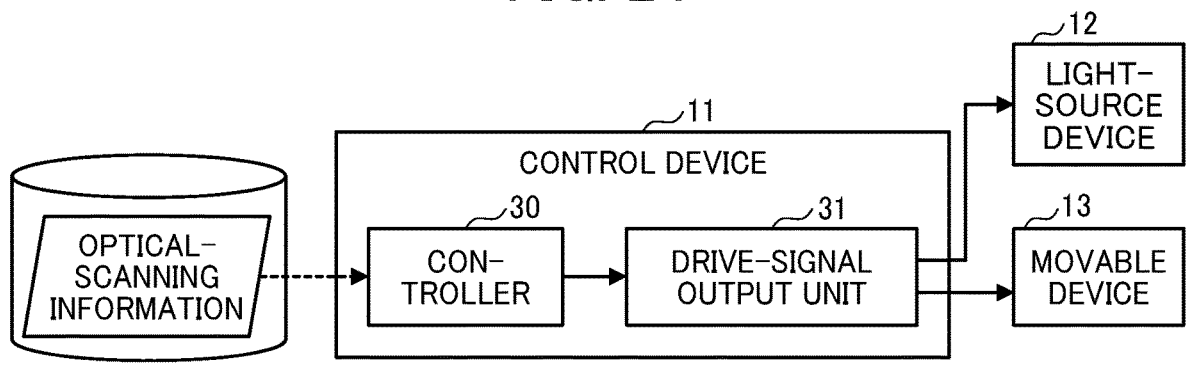
FIG. 24 is a functional block diagram of a control device according to an embodiment of the present disclosure.

Next, the functional configuration of the control device 11 of the optical scanning system 10 is described below referring to FIG. 24. FIG. 24 is a functional block diagram of the control device 11 of the optical scanning system 10, according to an embodiment of the present disclosure.

As illustrated in FIG. 24, the control device 11 has the functions of a controller 30 and a driving-signal output unit 31.

The controller 30 is implemented by, for example, the CPU 20 and the FPGA 23. The controller 30 acquires optical-scanning information from an external device, converts the optical-scanning information into a control signal, and outputs the control signal to the drive-signal output unit 31. For example, the controller 30 acquires image data serving as the optical-scanning information from an external device or the like, generates a control signal from the image data through predetermined processing, and outputs the control signal to the drive-signal output unit 31. The drive-signal output unit 31 is implemented by, for example, the light-source driver 25 and the movable-device driver 26. The drive-signal output unit 31 outputs a drive signal to the light-source device 12 or the movable device 13 in accordance with the received control signal.

The drive signal is a signal for controlling the driving of the light-source device 12 or the movable device 13. For example, the drive signal of the light-source device 12 is a drive voltage used to control the irradiation timing and irradiation intensity of the light source. Moreover, for example, the drive signal in the movable device 13 is a drive voltage used to control the timing and range of motion where the reflecting surface 14 provided in the movable device 13 is moved.

Figure 25:
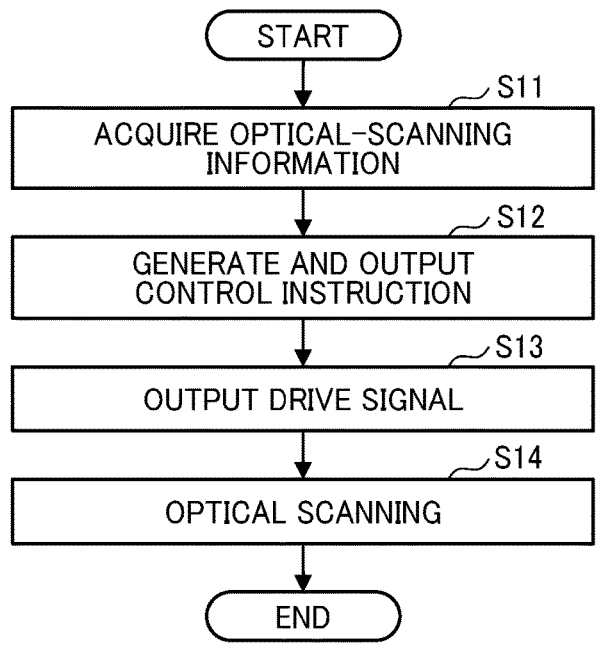
FIG. 25 is a flowchart of processing involved in the optical scanning system, according to an embodiment of the present disclosure.

Next, the process of optically scanning the target surface 15 performed by the optical scanning system 10 is described referring to FIG. 25. FIG. 25 is a flowchart of an example of processing performed by the optical scanning system 10.

In step S11, the controller 30 acquires optical-scanning information from, for example, an external device.

In step S12, the controller 30 generates control signals from the acquired optical-scanning information, and outputs the control signals to the drive-signal output unit 31.

In step S13, the drive-signal output unit 31 outputs drive signals to the light-source device 12 and the movable device 13 based on the received control signals.

In step S14, the light-source device 12 emits light based on the received drive signal.

In addition, the movable device 13 moves the reflecting surface 14 based on the received drive signal. The driving of the light-source device 12 and the movable device 13 causes light to be deflected in a given direction, and optical scanning is performed.

In the above-described optical scanning system 10, a single control device 11 has a device and a function for controlling the light-source device 12 and the movable device 13. However, a control device for the light-source device and a control device for the movable device may be separate elements.

In the above-described optical scanning system 10, a single control device 11 has the functions of the controller 30 and the functions of the drive-signal output unit 31 for the light-source device 12 and the movable device 13. These functions may be implemented by separate elements. For example, a drive-signal output device including a drive-signal output unit 31 may be provided in addition to the control device 11 including the controller 30. An optical deflection system that performs optical deflection may be configured by the control device 11 and the movable device 13 provided with the reflecting surface 14, which are elements of the above optical scanning system 10.

Incorporating the movable device according to an embodiment of the present disclosure into an optical scanning system enables the optical scanning system with a larger scanning angle.

An image projection apparatus, to which the movable device according to the embodiment is applied, is described next in detail referring to FIGS. 26 and 27.

Figure 26:
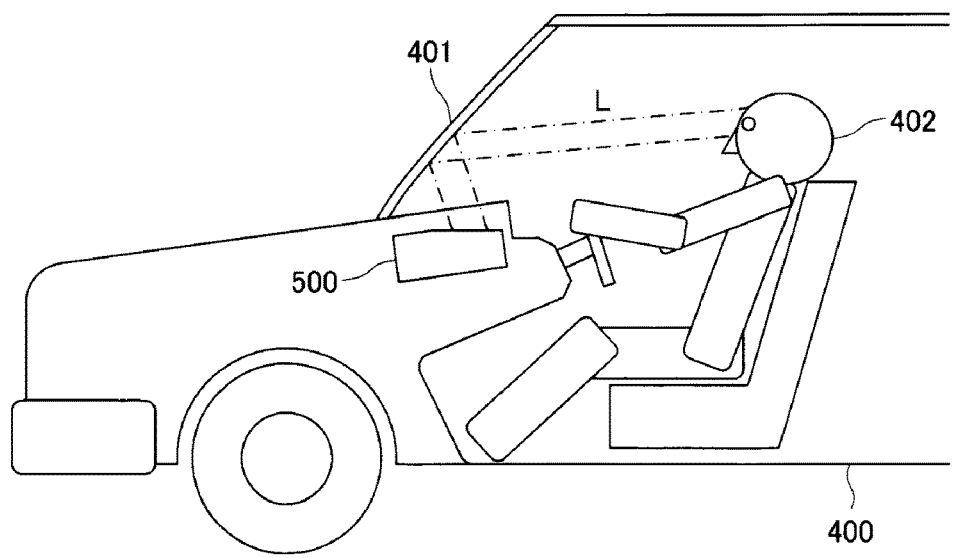
FIG. 26 is a schematic view of an example of a vehicle equipped with a head-up display device (HUD)

FIG. 26 is a schematic view of a vehicle 400 equipped with a HUD 500 as an example of an image projection device according to an embodiment. FIG. 27 is a schematic view of the HUD 500 according to an embodiment of the present disclosure.

The image projection apparatus projects an image by optical scanning, and is, for example, a HUD.

As illustrated in FIG. 26, for example, the HUD 500 is disposed, for example, near a windshield 401 of the vehicle 400. Projection light L that is emitted from the HUD 500 is reflected by the windshield 401 and directed to a viewer (a driver 402) as a user. Accordingly, the driver 402 can visually recognize as a virtual image an image projected by the HUD 500. Alternatively, a combiner may be mounted on the inner wall surface of the windshield 401 to enable the user to recognize a virtual image formed by the projection light that is reflected by the combiner.

Figure 27:
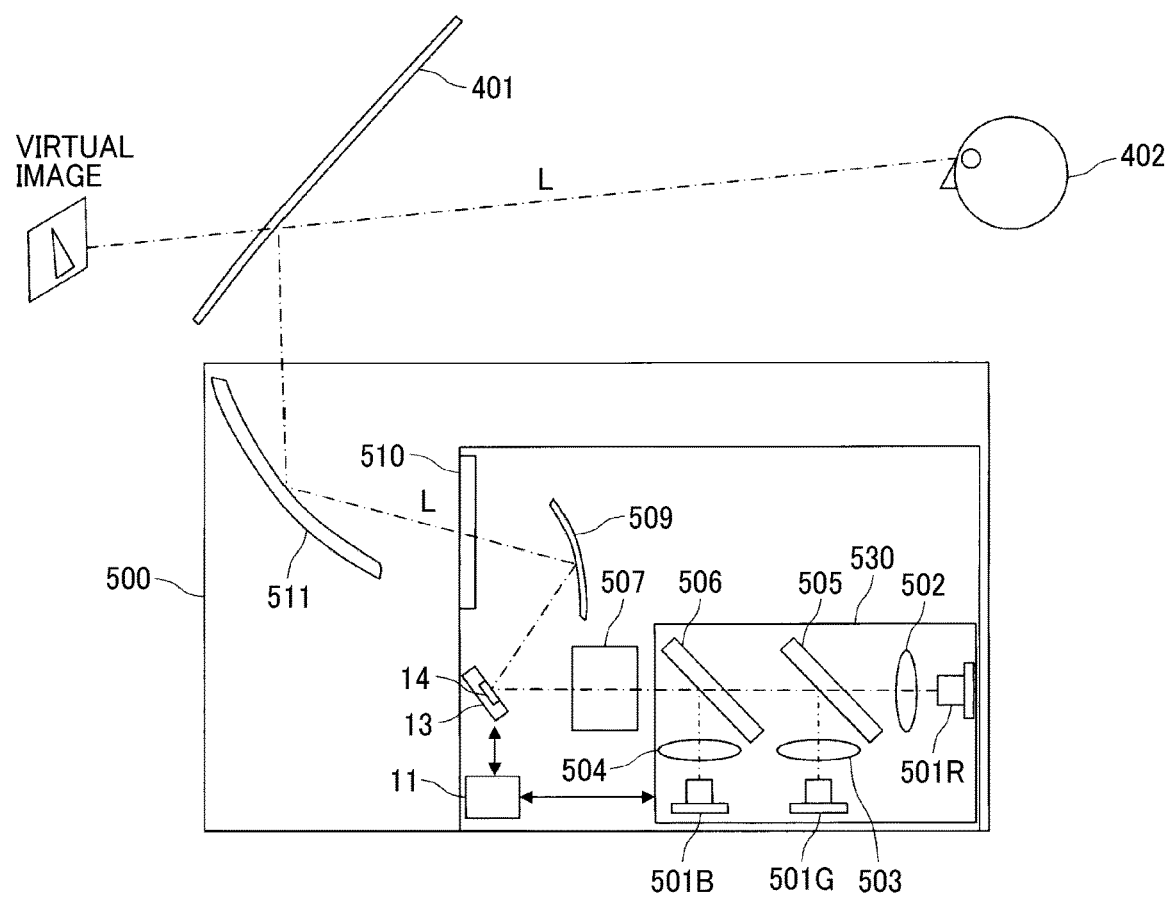
FIG. 27 is a schematic view of a HUD according to an embodiment of the present disclosure.

As illustrated in FIG. 27, the HUD 500 emits laser beams through red, green, and blue laser beam sources 501R, 501G, and 501B, respectively. The emitted laser beams pass through an incident optical system, and then are deflected by the movable device 13 including the reflecting surface 14. The incident optical system includes collimator lenses 502, 503, and 504 respectively provided for the laser-beam sources 501R, 501G, and 501B, two dichroic mirrors 505 and 506, and a light-intensity adjuster 507.

The deflected laser beams pass through a projection optical system and are projected onto a screen. The projection optical system includes a free-form surface mirror 509, an intermediate screen 510, and a projection mirror 511. In the HUD 500, the laser-beam sources 501R, 501G, 501B, the collimator lenses 502, 503, 504, and the dichroic mirrors 505, 506 are combined as a single unit that is an optical housing serving as a light source unit 530.

The HUD 500 projects an intermediate image displayed on the intermediate screen 510 onto the windshield 401 of the vehicle 400 to allow the driver 402 to visually recognize the intermediate image as a virtual image.

The laser beams of RGB colors emitted from the laser-beam sources 501R, 501G, and 501B are approximately collimated by the collimator lens 502, 503, and 504, and are combined by the two dichroic mirrors 505 and 506 each serving as an optical combiner. The light intensity of the combined laser beams is adjusted by the light-intensity adjuster 507, and then two-dimensional scanning is performed by the movable device 13 provided with the reflecting surface 14.

The projection light L that has been two-dimensionally scanned by the movable device 13 is reflected by the free-form surface mirror 509 so as to correct the distortion, and then is focused onto the intermediate screen 510 thus to display an intermediate image. The intermediate screen 510 includes a microlens array in which a plurality of microlenses is two-dimensionally arranged, and enlarges the projection light L incident on the intermediate screen 510 in units of microlens.

The movable device 13 moves the reflecting surface 14 biaxially in a reciprocating manner to perform two-dimensional scanning with the projection light L incident on the reflecting surface 14. The driving of the movable device 13 is controlled in synchronization with the light-emitting timings of the laser-beam sources 501R, 501G, and 501B.

In the above description, the heads-up display 500 is described as an example of the image projection apparatus. However, no limitation is indicated thereby, and the image projection apparatus may be any apparatus that performs optical scanning, using the movable device 13 provided with the reflecting surface 14, to project an image. For example, the present disclosure is also applicable to a projector that is placed on a desk or the like and projects an image on a display screen, a head-mounted display device that is incorporated in a wearable member on the head of the observer, for example, and that projects an image on a reflective-and-transmissive screen of the wearable member or on an eyeball as a screen, and the like.

The image projection device may be incorporated in, not only the vehicle or the wearable member, but also, for example, a mobile object such as an aircraft, a ship, or a mobile robot; or an immobile object such as an operation robot that operates a driving target such as a manipulator without moving from the installed location.

The HUD 500 is an example of the "head-up display" described in the claims. The vehicle 400 is an example of a mobile object recited in the claims.

Incorporating the movable device according to an embodiment of the present disclosure into image projection devices enables the image projection devices with a larger projectable area.

Next, an optical writing device to which the movable device 13 according to an embodiment of the present disclosure is applied is described in detail with reference to FIGS. 28 and 29.

Figure 28:
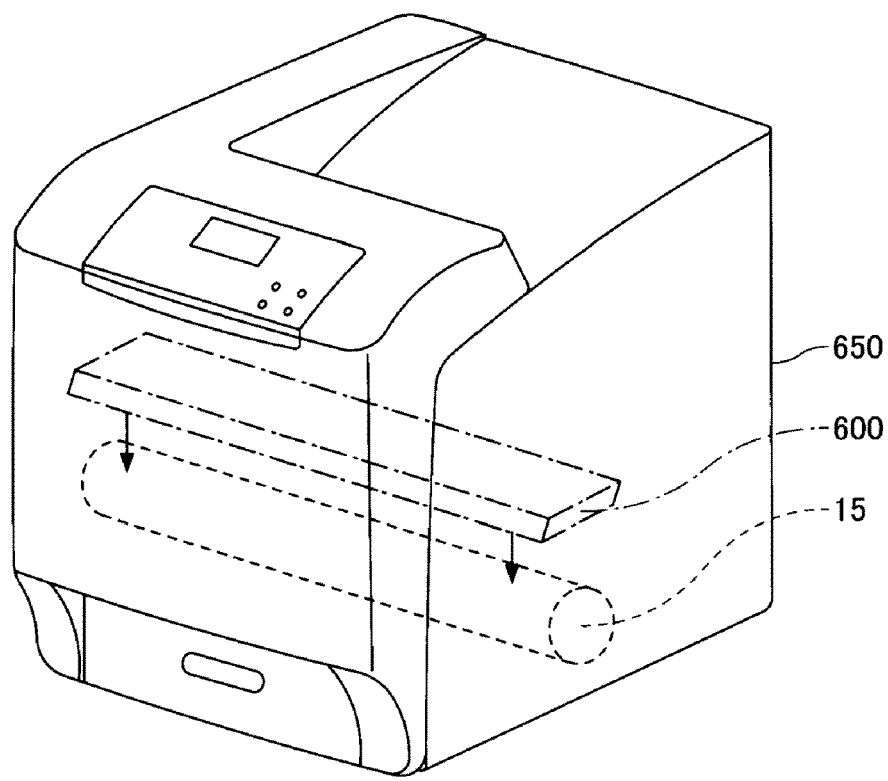
FIG. 28 is a schematic view of an example of an image forming apparatus equipped with an optical writing device.

FIG. 28 is an illustration of an example of an image forming apparatus equipped with an optical writing device 600. FIG. 29 is a schematic view of an example of the optical writing device 600.

As illustrated in FIG. 28, the optical writing device 600 is used as a component of an image forming apparatus typified by a laser printer 650, for example, having printer functions using laser beams. In the image forming apparatus, the optical writing device 600 performs optical scanning on a photoconductor drum, which is the target surface 15, by using one or more laser beams, thereby performing optical writing on the photoconductor drum.

Figure 29:
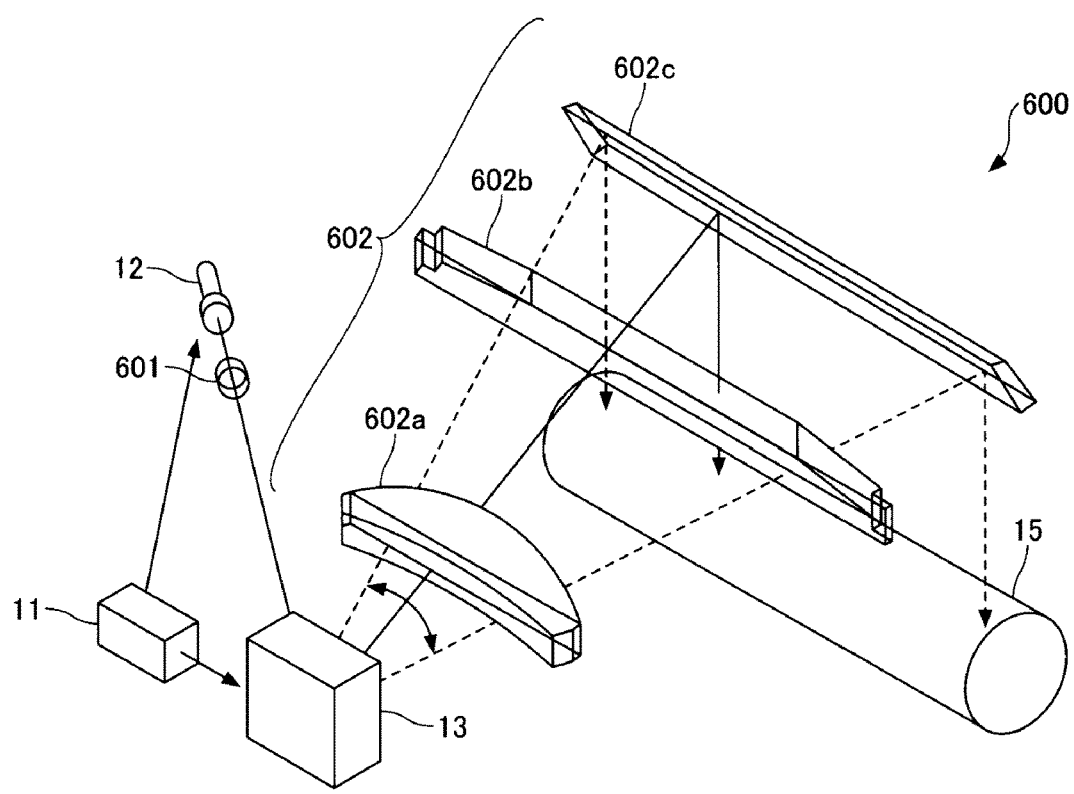
FIG. 29 is a schematic view of an example of the optical writing device.

As illustrated in FIG. 29, in the optical writing device 600, a laser beam from the light-source device 12 such as a laser element passes through an image forming optical system 601 such as a collimator lens and is then deflected uniaxially or biaxially by the movable device 13 having the reflecting surface 14. The laser beam deflected by the movable device 13 passes through a scanning optical system 602 constituted by a first lens 602a, a second lens 602b, and a reflecting mirror unit 602c, and is emitted onto the target surface 15 (e.g., a photoconductor drum or photosensitive paper), and thereby optical writing is performed. The scanning optical system 602 forms a laser beam in the form of a spot on the target surface 15. The light-source device 12 and the movable device 13 including the reflecting surface 14 are controlled by the control device 11.

As described above, the optical writing device 600 can be used as a component of the image forming apparatus having a printer function using laser beams. Moreover, by employing another scanning optical system to perform scanning in a biaxial manner in addition to the uniaxial manner, the optical writing device 600 can also be used as a component of an image forming apparatus such as a laser label apparatus that deflects laser beams to perform optical scanning on thermal media and print letters by heating.

The movable device 13 including the reflecting surface 14 to be applied to the optical writing device saves power of the optical writing device because power consumption for driving the movable device 13 is less than that for driving a rotational polygon mirror. The movable device 13 makes a smaller wind noise when the reflector base oscillates compared with a rotational polygon mirror, and thus is advantageous in achieving low noise of the optical writing device. The optical writing device requires much smaller installation space than the installation space of a rotational polygon mirror, and the amount of heat generated by the movable device 13 is small. Accordingly, downsizing is easily achieved, and thus the optical writing device is advantageous in downsizing the image forming apparatus.

Incorporating the movable device according to an embodiment of the present disclosure into optical writing device enables the optical writing device with a larger programmable domain.

Next, an object recognition device to which the movable device 13 according to an embodiment of the present disclosure is applied is described in detail with reference to FIGS. 30 and 31.

Figure 30:
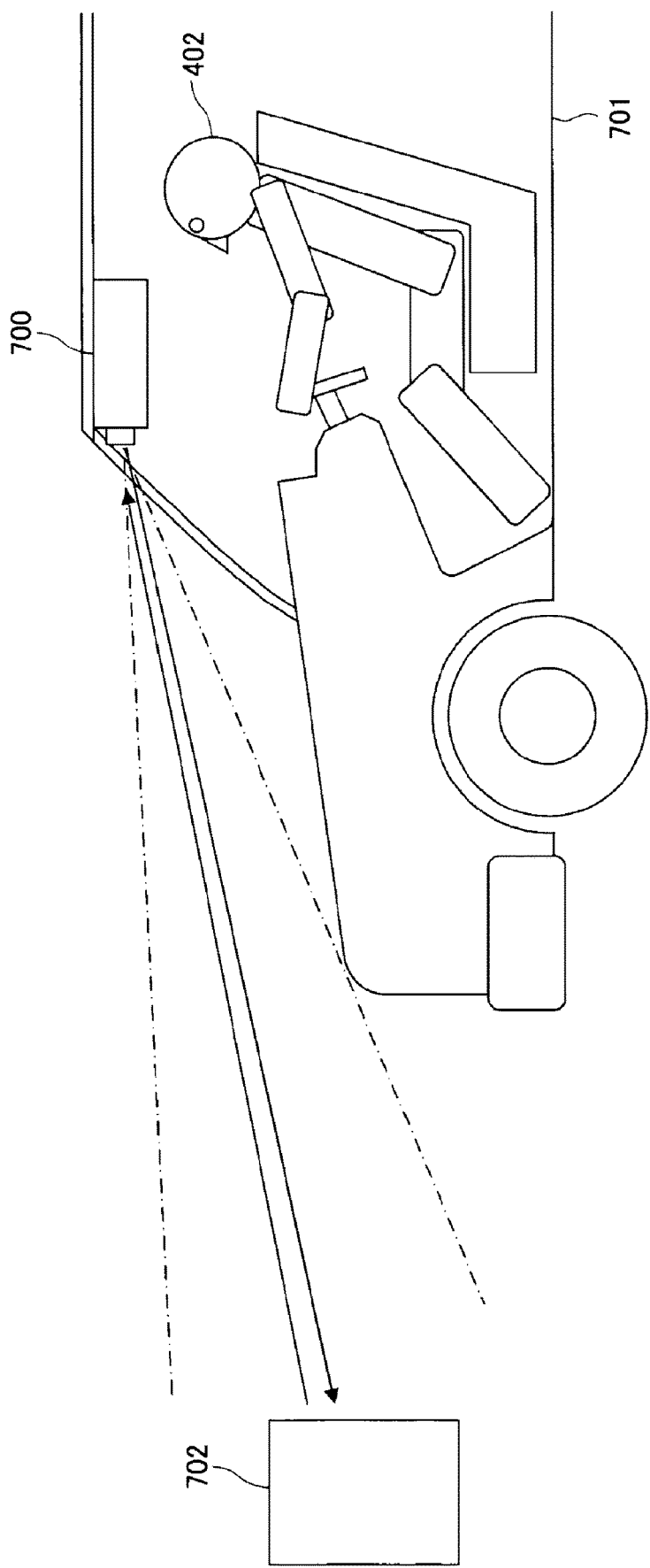
FIG. 30 is a schematic view of a vehicle equipped with a laser imaging detection and ranging (LiDAR) device, according to an embodiment of the present disclosure.

FIG. 30 is a schematic diagram of a vehicle provided with a LiDAR device that serves as an object recognition device according to an embodiment of the present disclosure. FIG. 31 is a schematic view of an example of the LiDAR device.

The object recognition device is an apparatus that recognizes an object in a target direction, and is, for example, a LiDAR device.

As illustrated in FIG. 30, for example, a LiDAR device 700 is mounted on a vehicle 701 to perform optical scanning in a target direction and receive the light reflected from an object 702 that exists in the target direction. Accordingly, the object 702 can be recognized by the LiDAR device 700.

Figure 31:
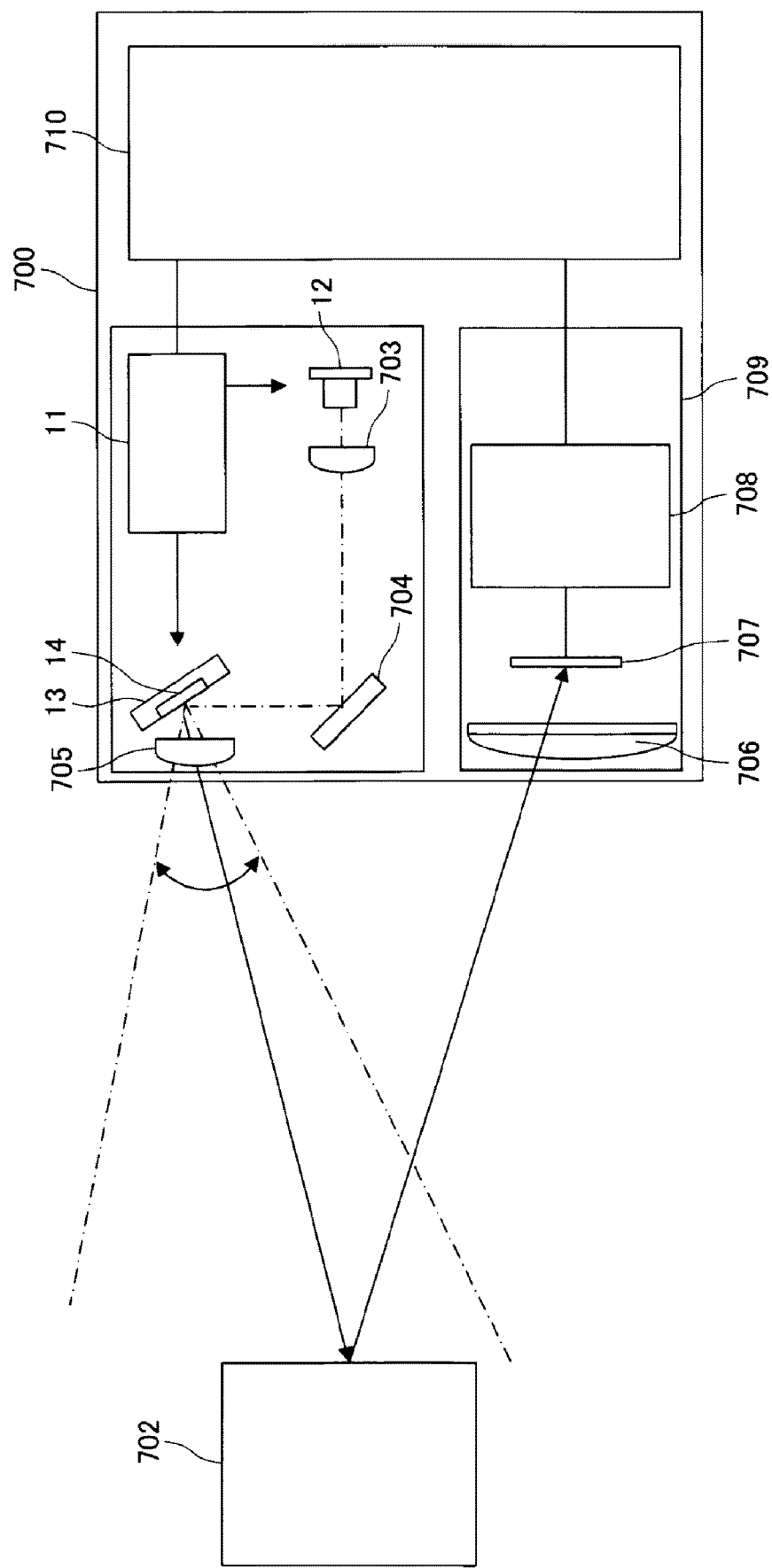
FIG. 31 is a schematic view of the LiDAR device according to an embodiment of the present disclosure.

As illustrated in FIG. 31, the laser beams emitted from a light-source device 12 pass through an incident optical system, and then are caused to perform scanning uniaxially or biaxially using the movable device 13 including the reflecting surface 14. The incidence optical system includes a collimator lens 703 that serves as an optical system that collimates divergent beams into approximately parallel beams, and a planar mirror 704. The parallel beams are emitted to the object 702 ahead of the device, as passing through, for example, a projection lens 705 that serves as a projection optical system. The driving of the light-source device 12 and the movable device 13 is controlled by the control device 11. The light reflected by the object 702 is detected by a photosensor 709.

More specifically, the reflected light passes through, for example, a condenser lens 706 that serves as an incident-light receiving and detecting optical system, and is received by an image sensor 707. Then, the image sensor 707 outputs a detected signal to a signal processing circuit 708. The signal processing circuit 708 performs predetermined processing on the received detected signal, such as binarization or noise processing, and outputs the result to a distance measuring circuit 710.

The distance measuring circuit 710 determines whether the object 702 is present based on the time difference between the timing at which the light-source device 12 emits laser beams and the timing at which the photosensor 709 receives the laser beams or the phase difference per pixel of the image sensor 707 that have received the laser beams. Moreover, the distance measuring circuit 710 calculates distance information indicating the distance from the object 702.

The movable device 13 including the reflecting surface 14 is less likely broken and is compact compared with a polygon mirror, and thus, a highly durable and compact LiDAR device can be provided. Such a LiDAR device is mounted on, for example, a vehicle, an aircraft, a ship, a robot, or the like, and can perform optical scanning within a predetermined range to determine whether an obstacle is present or to recognize the distance to the obstacle.

In the present embodiment, the LiDAR device 700 is described as an example of the object recognition device. However, no limitation is intended thereby. The object recognition device may be any apparatus that performs optical scanning by controlling the movable device 13 provided with the reflecting surface 14, using the control device 11, and that receives the receives the reflected laser beam using a photodetector to recognize the object 702.

For example, the present disclosure is also applicable to a biometric authentication apparatus, a security sensor, or a component of a three-dimensional scanner, for example. The biometric authentication apparatus performs optical scanning on a hand or face to obtain distance information, calculates object information such as the shape of the object using the distance information, and refers to records to recognize the object. The security sensor performs optical scanning in a target range to recognize an incoming object. The three-dimensional scanner performs optical scanning to obtain distance information, calculates object information such as the shape of the object using the distance information to recognize the object, and outputs the object information in the form of three-dimensional data.

Incorporating the movable device according to an embodiment of the present disclosure into object recognition devices enables the object recognition devices with a larger recognizable area.

Next, a laser headlamp 50 in which the movable device according to the present embodiment is applied to a headlight of a car is described with reference to FIG. 32.

Figure 32:
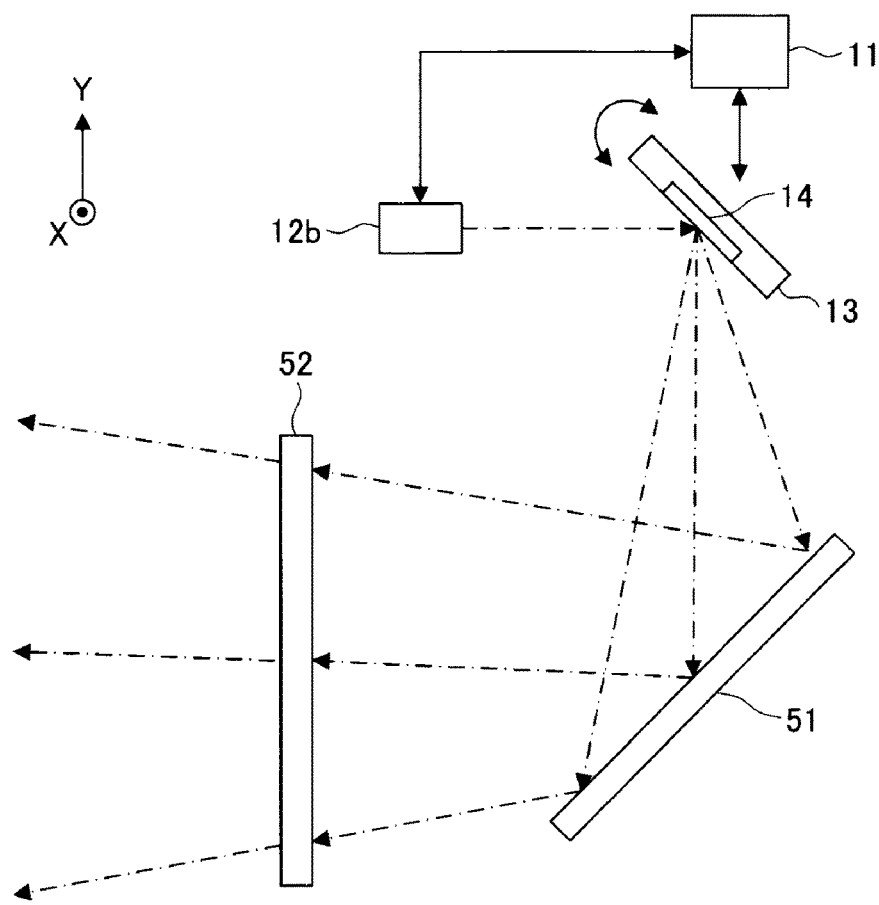
FIG. 32 is a schematic view of an example of a configuration of a laser headlamp.

FIG. 32 is an illustration of the configuration of a laser headlamp 50 according to an embodiment of the present disclosure.

The laser headlamp 50 includes a control device 11, a light-source device 12b, a movable device 13 including a reflecting surface 14, a mirror 51, and a transparent plate 52.

The light-source device 12b is a light source that emits blue laser beams. The laser beam emitted from the light-source device 12b is incident on the movable device 13 and is reflected by the reflecting surface 14. The movable device 13 moves the reflecting surface 14 in the XY-direction in accordance with signals from the control device 11, and performs two-dimensional scanning using the blue laser beam emitted from the light-source device 12b in the XY-direction.

The scanning light of the movable device 13 is reflected by the mirror 51, and is incident on the transparent plate 52. The transparent plate 52 is coated with a yellow phosphor on the front surface or the back surface. The blue laser beams that are reflected by the mirror 51 are converted into white light whose color is within the range of the statutory color for a headlight as passing through the yellow phosphor (fluorescent material) of the transparent plate 52. Accordingly, the front of the vehicle is illuminated with white light from the transparent plate 52.

The scanning light of the movable device 13 scatters in a predetermined manner as passing through the fluorescent material of the transparent plate 52. Accordingly, glare is attenuated at an illuminated target in the area ahead of the vehicle.

When the movable device 13 is applied to a headlight of a vehicle, the color of light beams from the light-source device 12*b* and the color of the phosphor are not limited to blue and yellow, respectively. For example, the light-source device 12*b* may emit near-ultraviolet light, and the transparent plate 52 may be coated with homogenized mixture of a plurality of kinds of fluorescent materials of red-green-blue (RGB) trichromatic colors. In this case as well, the light passing through the transparent plate 52 can be converted into white light, and the front of the vehicle can be illuminated with white light.

Incorporating the movable device according to an embodiment into laser head lamps enables the laser head lamps with a larger illuminable area.

Figure 33:
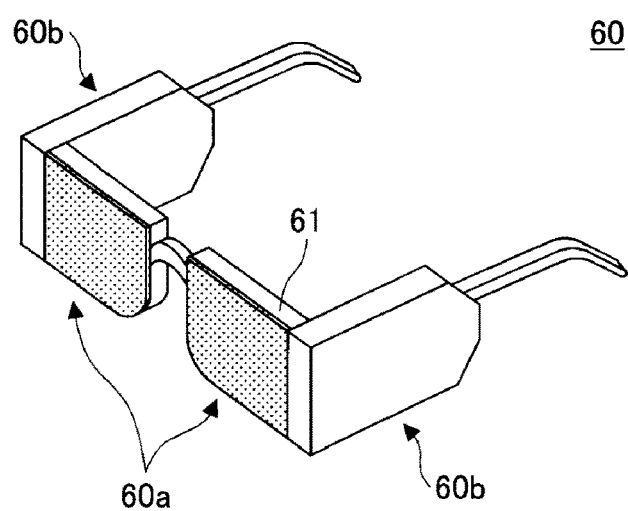
FIG. 33 is a perspective view of the configuration of a head-mounted display (HMD) according to an embodiment of the present disclosure.
Figure 34:
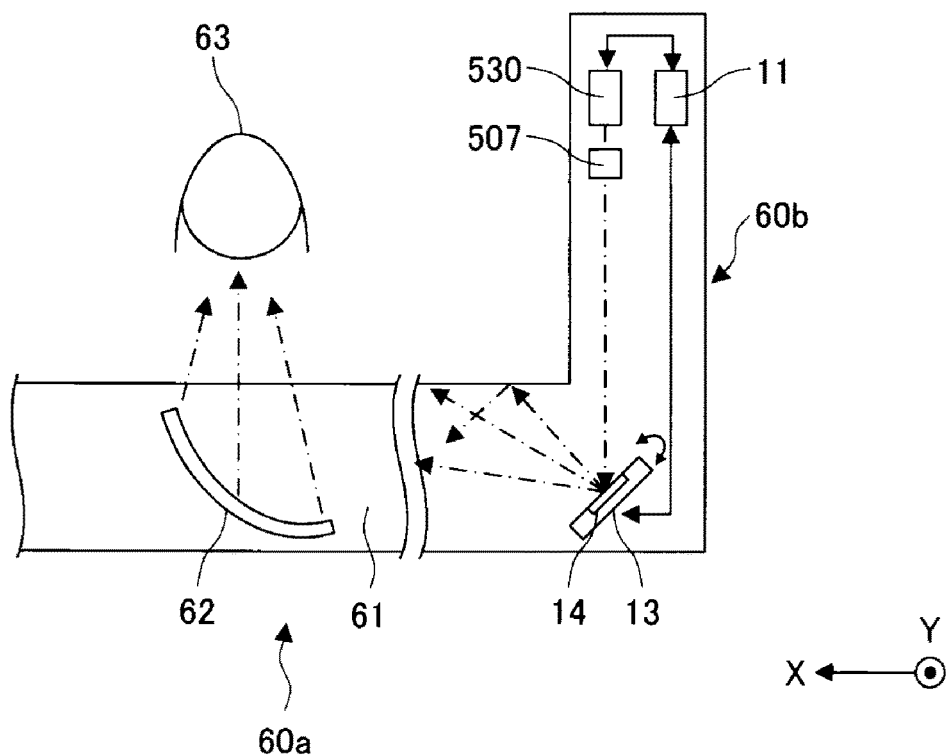
FIG. 34 is an illustration of the configuration of the HMD according to an embodiment of the present disclosure.

Next, a head-mounted display (HMD) 60 to which the movable device 13 according to an embodiment is applied is described referring to FIGS. 33 and 34. Note that the HMD 60 is a head-mounted display that can be mounted on a human head, and can be shaped like, for example, glasses. In the following description, such a head-mounted display may be referred to simply as an HMD.

FIG. 33 is a perspective view of the appearance of the HMD 60. In FIG. 33, the HMD 60 includes a pair of a front 60*a* and a temple 60*b* on each of the left and right, which are approximately symmetrically arranged. The front 60*a* can include, for example, a light guide plate 61. An optical system, a control device, and the like, can be incorporated in the temple 60*b*.

FIG. 34 is an illustration of a configuration of a part of the HMD 60. Although the configuration for the left eye is illustrated in FIG. 34, the HMD 60 has a configuration similar to that for the right eye.

The HMD 60 includes a control device 11, a light source unit 530, a light-intensity adjuster 507, a movable device 13 including a reflecting surface 14, a light guide plate 61, and a half mirror 62.

The light source unit 530 includes, as described above, the laser-beam sources 501R, 501G, and 501B, the collimator lenses 502, 503, and 504, and the dichroic mirrors 505 and 506, and these elements are combined as a single unit in the optical housing. In the light source unit 530, the laser beams of the RGB colors that are emitted from the laser-beam sources 501R, 501G, and 501B are combined by the two dichroic mirrors 505 and 506 each as serving as an optical combiner. The combined parallel light is emitted from the light source unit 530.

The light intensity of the combined laser beams from the light source unit 530 is adjusted by the light-intensity adjuster 507, and then the light is incident on the movable device 13. The movable device 13 moves the reflecting surface 14 in the XY-direction based on the signal from the control device 11, and performs two-dimensional scanning with the light emitted from the light source unit 530. The driving of the movable device 13 is controlled in synchronization with the light emission timings of the laser-beam sources 501R, 501G, and 501B, and a color image is formed with the scanning light.

The scanning light of the movable device 13 is incident on the light guide plate 61. The light guide plate 61 guides the scanning light to the half mirror 62 while reflecting the scanning light on the inner wall surface. The light guide plate 61 is formed by, for example, resin that has transparency to the wavelength of the scanning light.

The half mirror 62 reflects the light that is guided through the light guide plate 61 to the rear side of the HMD 60, and the reflected light exits towards an eye of a wearer 63 of the HMD 60. The half mirror 62 has, for example, a free-form surface shape. The image of the scanning light is reflected by the half mirror 62, and then is formed on the retina of the wearer 63. The image of the scanning light is formed on the retina of the wearer 63 due to the reflection at the half mirror 62 and the effect of the crystalline lenses of eyeballs. Moreover, due to the reflection at the half mirror 62, the spatial distortion of the image is corrected. The wearer 63 can observe an image formed by the light of scanning in the XY direction.

The wearer 63 observes an image of external light superposed on the image of the scanning light because of the half mirror 62. The half mirror 62 may be replaced with a mirror to exclude the extraneous light. In such a configuration, only the image that is formed by scanning light can be observed.

Incorporating the movable device according to an embodiment of the present disclosure into HMDs enables the HMDs with a larger area for forming an image.

Figure 35:
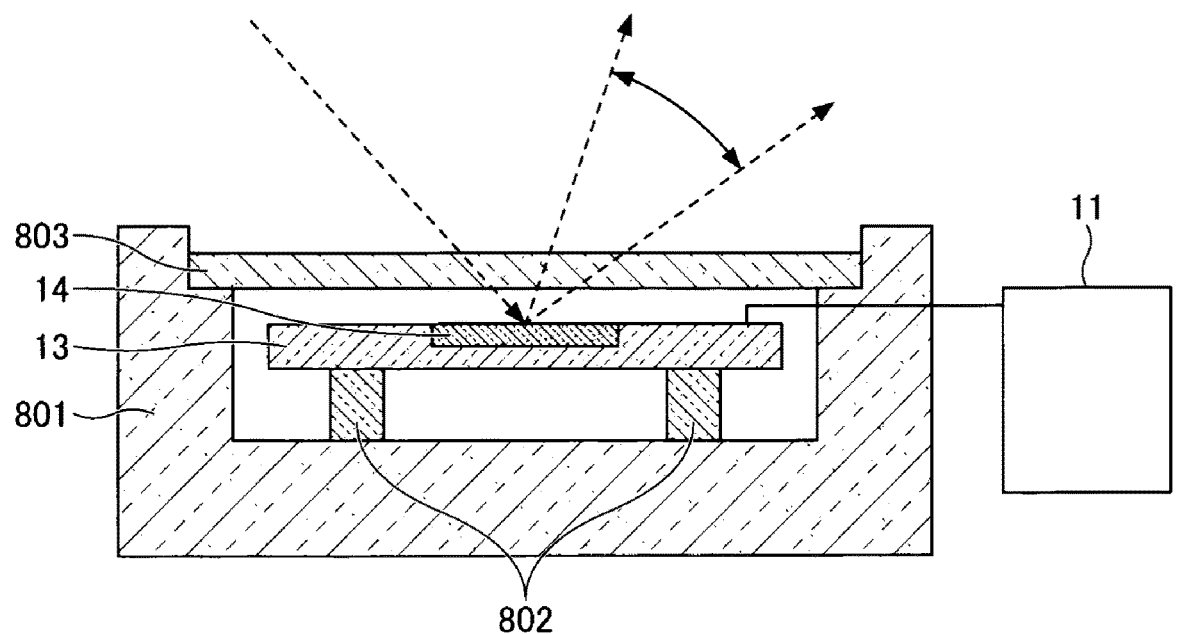
FIG. 35 is a schematic view of a packaged movable device.

Next, packaging of the movable device 13 according to the embodiment is described referring to FIG. 35.

FIG. 35 is a schematic view of an example of a packaged movable device 13.

As illustrated in FIG. 35, the movable device 13 is mounted on a mounting component 802 inside the package 801, and is hermetically sealed and packaged as a part of the package 801 is covered with a light transmission member 803. The package contains inert gas such as nitrogen and is sealed. This configuration can substantially prevent the deterioration of the movable device 13 due to oxidation, and increase the durability against changes in environment such as temperature.

Although the preferred embodiments have been described in detail above, the present disclosure is not limited to the above-described embodiments, and various modifications and substitutions may be made to the above-described embodiments without departing from the scope described in the claims.

Although in the above-described embodiments, the movable unit includes a mirror unit, the mirror unit may be replaced by, for example, a diffraction grating, a photodiode, a heater (e.g., a heater using silicon mononitride (SiN), or a light source (e.g., a surface-emitting laser).

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A movable device comprising:
a first member including:
   a movable object having a rotation axis;
   a first actuator to cause the movable object to oscillate, the first actuator including:
      a support having one end coupled to the movable object to support the movable object; and
      a driver having a fixed edge, the driver being coupled to another end of the support, the driver causing the support to deform and thereby causing the movable object to oscillate; and
   a stationary part to which the fixed edge of the driver of the first actuator is fixed; and
a second member including two or more other actuators other than the first actuator, to cause the movable object to oscillate,
wherein an opposite edge of the driver, which is opposite to the fixed edge, faces the movable object as viewed from a center of the movable object in a plan view,
wherein the movable device has a first region including the driver and a second region without the driver, which are divided by a virtual line passing through the center of the movable object and parallel to the rotation axis of the movable object, and
wherein the support is coupled to the movable object within the second region.

2. A movable device comprising:
a first member including:
   a movable object having a rotation axis;
   a first actuator to cause the movable object to oscillate, the first actuator including:
      a support having one end coupled to the movable object to support the movable object; and
      a driver having a fixed edge, the driver being coupled to another end of the support, the driver causing the support to deform and thereby causing the movable object to oscillate; and
   a stationary part to which the fixed edge of the driver of the first actuator is fixed; and
a second member including two or more other actuators other than the first actuator, to cause the movable object to oscillate,
wherein an opposite edge of the driver, which is opposite to the fixed edge facing the stationary part, does not face the movable object as viewed from a center of the movable object in a plan view,
wherein the movable device has a first region including the driver and a second region without the driver, which are divided by a virtual line passing through the center of the movable object and orthogonal to the rotation axis of the movable object, and
wherein the support is coupled to the movable object within the second region.

3. The movable device according to claim 1,
wherein the movable device has four planar areas, respectively corresponding to first, second, third, and fourth quadrants, divided by the virtual line and a straight line orthogonal to the virtual line and passing through the center of the movable object in the plan view, and
wherein the first quadrant and the second quadrant are closer to the driver than the other quadrans of the four planar areas, and
wherein the support is coupled to the movable object within the fourth quadrant.

4. The movable device according to claim 1,
wherein the movable device has four planar areas, respectively corresponding to first, second, third, and fourth quadrants, divided by the virtual line and a straight line orthogonal to the virtual line and passing through the center of the movable object in the plan view, and
wherein the first quadrant and the second quadrant are closer to the driver than the other quadrans of the four planar areas, and
wherein a coupling portion of the support and the movable object extends over the first quadrant and the fourth quadrant.

5. The movable device according to claim 1,
wherein the support has a shape including an arc with a center coincident with the center of the movable object.

6. The movable device according to claim 5,
wherein a gap having a substantially constant width extends along a periphery of the movable object, between the periphery of the movable object and an innermost circumference of the arc of the support.

7. The movable device according to claim 1,
wherein the support has a meandering structure.

8. The movable device according to claim 1,
wherein the support has a portion with a width greater than a width of another portion.

9. The movable device according to claim 1,
wherein the movable object includes:
a mirror;
a movable beam; and
a bar having one end coupled to the movable beam and another end coupled to the mirror, to support the mirror unit to allow a resonant actuation of the mirror.

10. The movable device according to claim 1,
wherein the movable object includes two meandering structures and a mirror between the two meandering structures, each of the two meandering structures having one end coupled to the movable object and another the other end coupled to the mirror, to support the mirror to allow a resonant actuation of the mirror.

11. The movable device according to claim 1,
wherein the driver has a meandering structure.

12. An image projection apparatus comprising:
a light source to emit light; and
the movable device according to claim 1 to deflect the light emitted from the light source to project an image.

13. The image projection apparatus according to claim 12, further comprising a combiner,
wherein the light source includes a plurality of light sources to emit light beams having different wavelengths,
wherein the combiner is to combine the light beams emitted from the plurality of light sources to generate light, and
wherein the movable device deflects the light from the combiner to project an image.

14. A head up display comprising the movable device according to claim 1.

15. A laser head lamp comprising the movable device according to claim 1.

16. A head mount display comprising the movable device according to claim 1.

17. An object recognition device comprising:
a light source to emit light;
the movable device according to claim 1 to deflect the light emitted from the light source; and a photosensor to detect light reflected by an object that has been illuminated with the light deflected by the movable device to recognize the object.

18. A mobile object comprising the head up display according to claim 14.

19. A mobile object comprising the laser head lamp according to claim 15.

20. A mobile object comprising the object recognition device according to claim 17.

* * * * *